United States Patent
Sahin et al.

(10) Patent No.: US 11,563,618 B2
(45) Date of Patent: Jan. 24, 2023

(54) METHODS, APPARATUSES AND SYSTEMS DIRECTED TO UNIQUE WORD DISCRETE FOURIER TRANSFORM SPREAD AND SHAPED ORTHOGONAL FREQUENCY DIVISION MULTIPLEXING BASED TRANSMISSIONS

(71) Applicant: IDAC Holdings, Inc., Wilmington, DE (US)

(72) Inventors: Alphan Sahin, Westbury, NY (US); Erdem Bala, East Meadow, NY (US); Rui Yang, Greenlawn, NY (US); Mihaela C. Beluri, Jericho, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 78 days.

(21) Appl. No.: 16/090,570

(22) PCT Filed: Mar. 30, 2017

(86) PCT No.: PCT/US2017/025118
§ 371 (c)(1),
(2) Date: Oct. 1, 2018

(87) PCT Pub. No.: WO2017/173131
PCT Pub. Date: Oct. 5, 2017

(65) Prior Publication Data
US 2020/0052947 A1    Feb. 13, 2020

Related U.S. Application Data

(60) Provisional application No. 62/316,562, filed on Mar. 31, 2016.

(51) Int. Cl.
*H04L 27/26*   (2006.01)
*H04W 72/04*   (2009.01)
*H04L 5/00*    (2006.01)

(52) U.S. Cl.
CPC ..... *H04L 27/2636* (2013.01); *H04W 72/0453* (2013.01); *H04L 5/0007* (2013.01)

(58) Field of Classification Search
CPC .............. H04L 27/2636; H04L 5/0007; H04L 27/26; H04L 27/2634; H04L 27/2637;
(Continued)

(56) References Cited

U.S. PATENT DOCUMENTS

2008/0126461 A1* 5/2008 Christoph ............... H04S 1/007
708/403
2008/0310543 A1* 12/2008 Helfenstein ......... H04L 27/0008
375/295

(Continued)

OTHER PUBLICATIONS

Sahin et al ("An improved unique word DFT-spread OFDM scheme for 5G system", 2015 IEEE Globecom Workshops Proceedings, Dec. 6-10, San Diego, USA).*

(Continued)

*Primary Examiner* — Ian N Moore
*Assistant Examiner* — Sun Jong Kim
(74) *Attorney, Agent, or Firm* — Julian F. Santos

(57) ABSTRACT

Methods, apparatuses, systems, devices, and computer program products directed to unique word (UW) discrete Fourier transform (DFT) spread and shaped orthogonal frequency division multiplexing (OFDM) ("UW DFT-S-S-OFDM") based communications are provided. Among new methodologies and/or technologies provided is a method implemented in transmitter and includes any of: transforming a set of data symbols and a UW sequence into a frequency domain ("$f_{DOM}$") signal using a DFT; replicating the $f_{DOM}$ signal so as to form a plurality of $f_{DOM}$ signal (Continued)

instances, wherein the plurality of $f_{DOM}$ signal instances is inclusive of the $f_{DOM}$ signal; shaping one or more of the plurality of $f_{DOM}$ signal instances; combining the plurality of $f_{DOM}$ signal instances to form a combined $f_{DOM}$ signal; transforming the combined $f_{DOM}$ signal into a block-based signal using an inverse DFT (IDFT); and outputting the block-based signal.

25 Claims, 20 Drawing Sheets

(58) Field of Classification Search
CPC .. H04L 27/263; H04W 72/0453; H04B 1/707; H04B 1/713
See application file for complete search history.

(56) References Cited

U.S. PATENT DOCUMENTS

| | | | |
|---|---|---|---|
| 2009/0191814 A1* | 7/2009 | Blu | H04L 25/03006 455/63.1 |
| 2009/0245444 A1* | 10/2009 | Fang | H04J 1/12 375/350 |
| 2011/0134902 A1* | 6/2011 | Ko | H04B 7/0434 370/344 |
| 2014/0341259 A1* | 11/2014 | Kim | H04B 1/713 375/135 |
| 2014/0369397 A1* | 12/2014 | Nakamura | H04B 7/0639 375/232 |
| 2015/0061911 A1* | 3/2015 | Pagnanelli | H03M 3/358 341/144 |
| 2019/0349230 A1* | 11/2019 | Atungsiri | H04L 27/2649 |

OTHER PUBLICATIONS

Berardinelli et al ("On the potential of OFDM enhancements as 5G waveforms", 2014 IEEE 79th Vehicular Technology Conference (VTC Spring), May 18-21, 2014, Seoul, Korea (Year: 2014).*
Coon, Justin, et al., "Channel and Noise Variance Estimation and Tracking Algorithms for Unique-Word Based Single-Carrier Systems", IEEE Transactions on Wireless Communications, vol. 5, No. 6, Jun. 2006, 5 pages.
Falconer, David, et al., "Frequency Domain Equalization for Single-Carrier Broadband Wireless Systems", IEEE Communications Magazine, Apr. 2002, 9 pages.
Michailow, Nicola, et al., "Generalized Frequency Division Multiplexing: Analysis of an Alternative Multi-Carrier Technique for Next Generation Cellular Systems", International Symposium on Wireless Communication Systems, Aug. 2012, 5 pages.
"IMT Vision—Framework and overall objectives of the future development of IMT for 2020 and beyond", International Telecommunication Union, Sep. 2015, 21 pages.
"International Search Report and Written Opinion", International Patent Application No. PCT/US2017/025118, dated Jul. 18, 2017, 12 pages.
Ghosh, Amitava, et al., "LTE-Advanced: Next-Generation Wireless Broadband Technology", IEEE Wireless Communications, vol. 17, No. 3, Jun. 2010, 13 pages.
"Part II: Wireless LAN Medium Access Control (MAC) and Physical Layer (PHY) Specifications", IEEE Std 802.11, Mar. 29, 2012, 2793 pages.
Nokia, et al., "Waveform Simulation Results for Above 40 GHz", 3GPP R1-1609596, 3GPP TSG-RAN WG1#86bis, Lisbon, Portugal, Oct. 14-16, 2016, 7 pages.
Berardinelli, Gilberto, et al., "On the potential of OFDM enhancements as 5G waveforms", IEEE 79$^{th}$ Vehicular Technology Conference (VTC Spring), May 2014, 5 pages.
Berardinelli, Gilberto, et al., "On the potential of zero-tail DFT-spread-OFDM in 5G networks", IEEE 80$^{th}$ Vehicular Technology Conference (VTC Spring), Sep. 2014, 6 pages.
Berardinelli, Gilberto, et al., "Zero-tail DFT-spread-OFDM signals", Globecom Workshop, 2013, 6 pages.
Huemer, Mario, et al., "Design and Analysis of UW-OFDM signals", AEU—International Journal of Electronics and Communications vol. 68, No. 10, Oct. 2014, 11 pages.
Huemer, Mario, et al., "Unique Word Based Phase Tracking Algorithms for SC/FDE-Systems", IEEE Globecom, vol. 1, Dec. 2003, 5 pages.
Li, An, et al., "Transmission of 1 Tb/s-Unique-Word DFT-Spread OFDM Superchannel Over 8000 km EDFA—Only SSMF Link", Journal of Lightwave Technology, vol. 30, No. 24, Dec. 15, 2012, 8 pages.
Michailow, Nicola, et al., "Generalized Frequency Division Multiplexing for 5th Generation Cellular Networks", IEEE Transactions on Communications, vol. 62, No. 9, Sep. 2014, 17 pages.
Michailow, Nicola, et al., "Low Peak-to-Average Power Ratio for Next Generation Cellular Systems with Generalized Frequency Division Multiplexing", 2013 International Symposium on Intelligent Signal Processing and Communication Systems, Nov. 2013, 5 pages.
Myung, Hyung G., et al., "Peak Power Characteristics of Single Carrier FDMA MIMO Precoding System", IEEE 66$^{th}$ Vehicular Technology Conference (VTC Fall), Sep. 2007, 5 pages.
Pancaldi, Fabrizio, et al., "Single-Carrier Frequency Domain Equalization", IEEE Signal Processing Magazine, vol. 25, No. 5, Sep. 2008, 20 pages.

* cited by examiner a) Without UW b) With random UW

EXAMPLE TIME SAMPLES

EXAMPLE OOB LEAKAGE

RANDOM UW, 4QAM

BLOCK ERROR RATE
RANDOM UW, 4QAM

BLOCK ERROR RATE
256QAM, τ=0.2, exponential decaying channel

METHODS, APPARATUSES AND SYSTEMS DIRECTED TO UNIQUE WORD DISCRETE FOURIER TRANSFORM SPREAD AND SHAPED ORTHOGONAL FREQUENCY DIVISION MULTIPLEXING BASED TRANSMISSIONS

CROSS REFERENCE TO RELATED APPLICATION(S)

This application is the National Stage of International Application No. PCT/US2017/025118, filed 30 Mar. 2017, which claims the benefit of U.S. Provisional Patent Application No. 62/316,562, filed 31 Mar. 2016, which is incorporated herein by reference in its entirety.

BACKGROUND

The design of the next generation of wireless systems is currently underway in the academia, industry, regulatory and standardization bodies. The IMT-2020 Vision sets the framework and overall objectives for the development of the next generation of wireless systems. To address an anticipated increase in wireless data traffic, demand for higher data rates, low latency and massive connectivity, the IMT-2020 Vision defines the main use cases that drive fifth generation (5G) design requirements: enhanced mobile broadband (eMBB), ultra-reliable low latency communications (URLLC), and massive machine type communications (mMTC). These use cases have widely different targets on peak data rates, latency, spectrum efficiency, and mobility. Although the IMT-2020 Vision indicates not all of the key capabilities are equally important for a given use case, it is important to build flexibility in the 5G designs, to enable meeting expected use-case specific requirements and support multiple services. The air interface, specifically the physical (PHY) layer waveform, is one of a number of key components for new 5G technology.

Fourth generation (4G) long term evolution (LTE) and IEEE 802.11 systems use PHY layer waveforms that employ orthogonal frequency division multiplexing (OFDM) due, in part, to its simplicity in the way it mitigates frequency selectivity of channels—by converting them into smaller flat fading sub-channels, referred to as subcarriers. The OFDM waveforms of such systems also employ cyclic prefixing to prevent inter-symbol interference (ISI) resulting from channel delay spread and timing synchronization errors, and to enable simple one-tap equalizers per subcarrier. However, OFDM waveforms have high peak-to-average power ratio (PAPR) as compared to waveforms employed by single-carrier systems which limits their use in the uplink (UL). The 4G LTE systems use a discrete Fourier transform (DFT) spread OFDM (DFT-s-OFDM) waveform in the UL. The DFT-s-OFDM waveform improves upon the PAPR of the OFDM waveform by spreading a data sequence to be transmitted with a DFT before loading the spread signal onto the subcarriers. However, both OFDM and DFT-s-OFDM waveforms exhibit high out of band (OOB) emissions, which may be a limiting factor for 5G networks. Nevertheless, low-complexity implementations of OFDM and DFT-s-OFDM waveforms with fast Fourier transformation (FFT) may make these waveforms a baseline for the 5G PHY, but requiring further development, including developing OFDM-like waveforms that improve PAPR, OOB emissions, while maintaining the advantages of OFDM and providing low complexity transmitter and receiver structures.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1E, where various elements of the network may utilize, perform, be arranged in accordance with and/or be adapted and/or configured for the methods, apparatuses and systems provided herein.

Figure 1A:
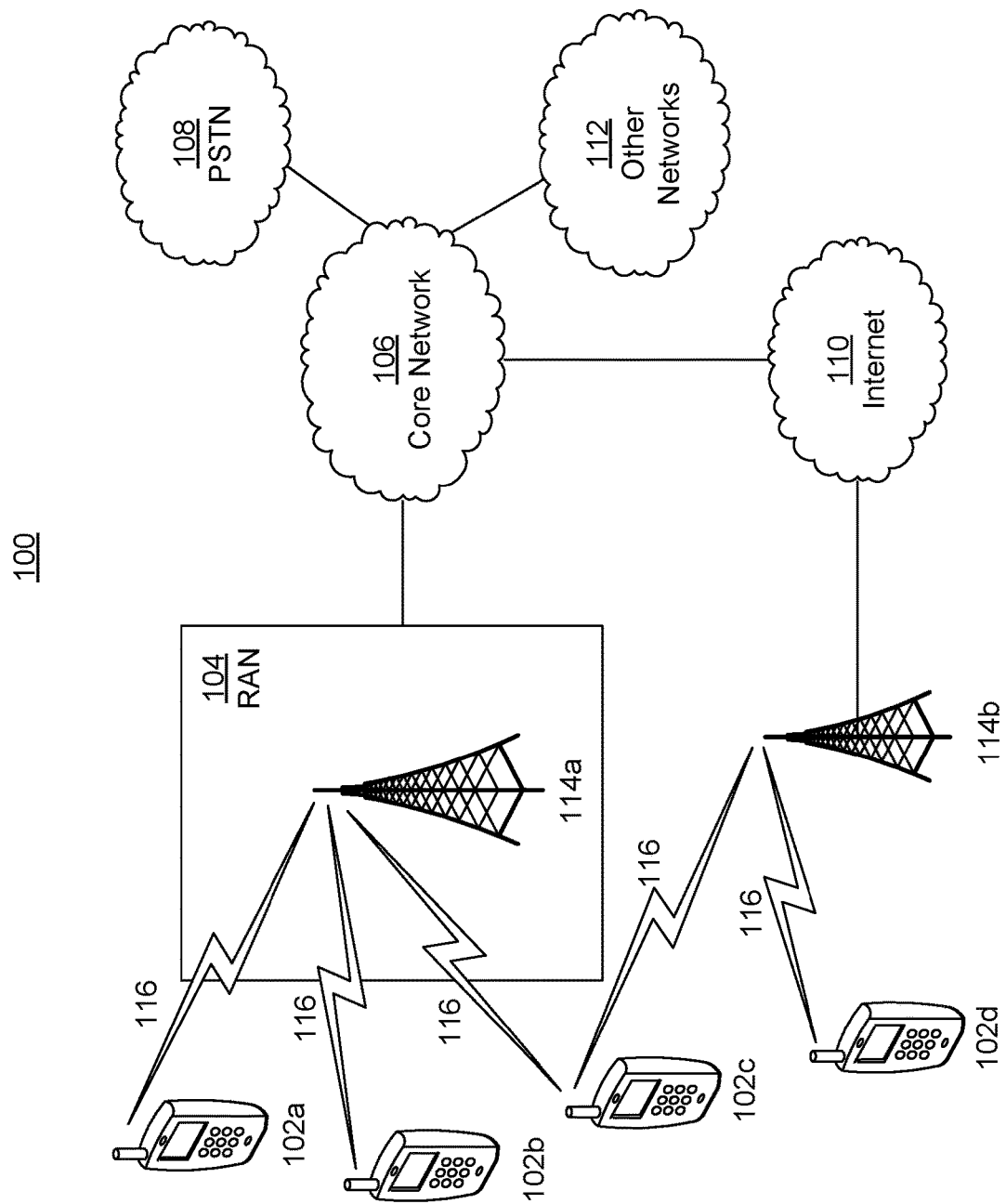
FIG. 1A is a system diagram of an example communications system in which one or more disclosed embodiments may be implemented.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
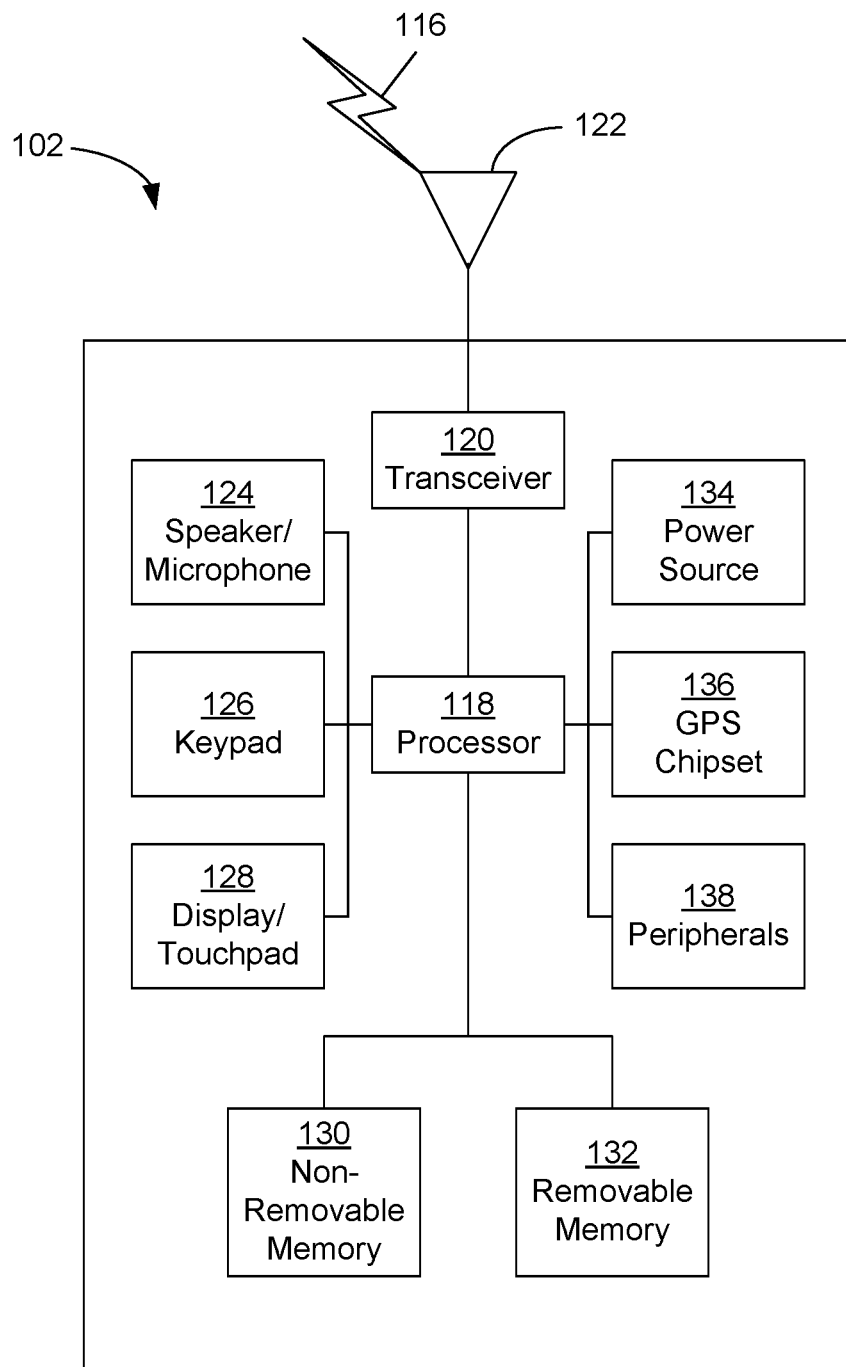
FIG. 1B is a system diagram of an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
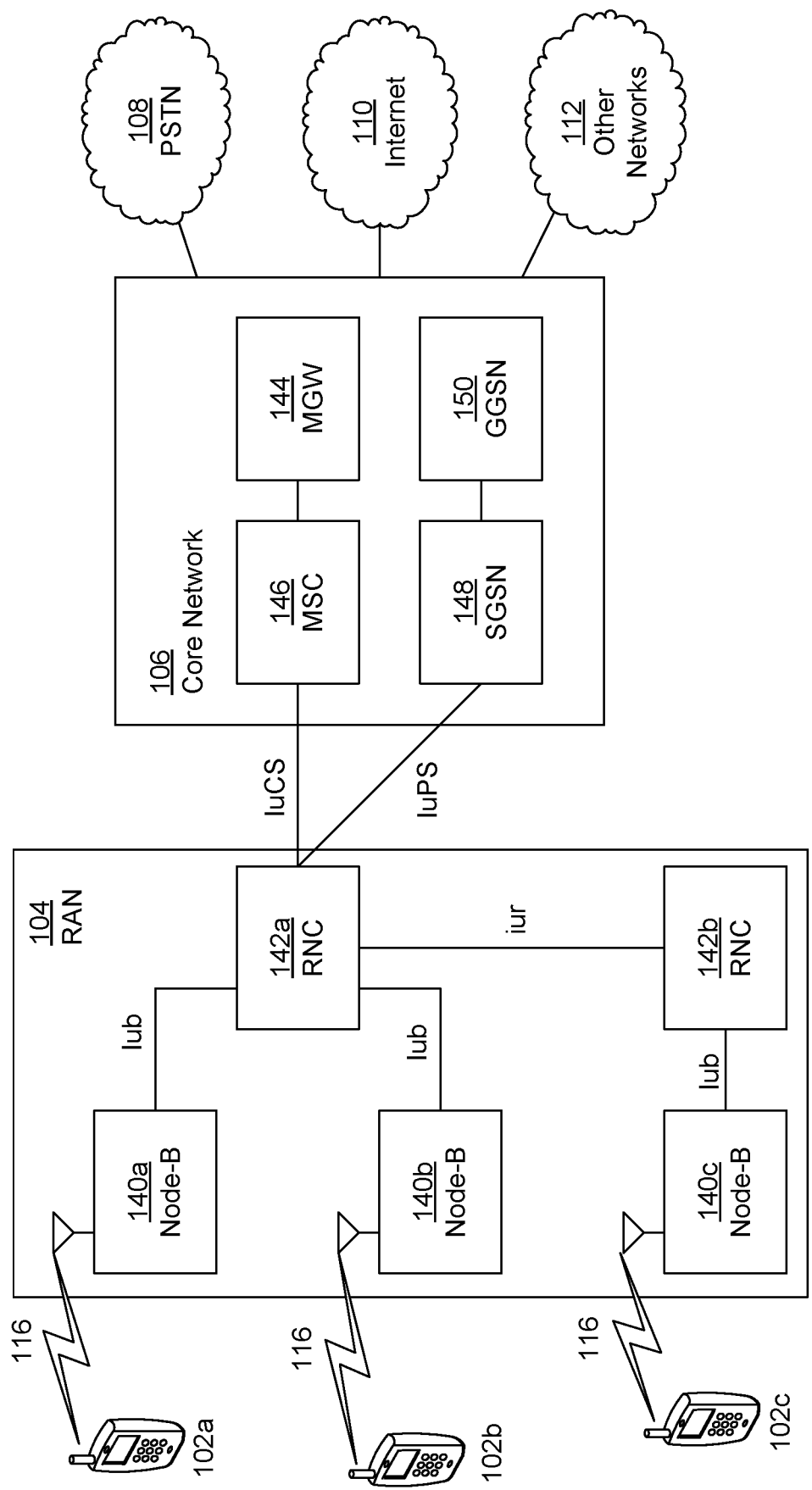
FIGS. 1C, 1D and 1E are system diagrams of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
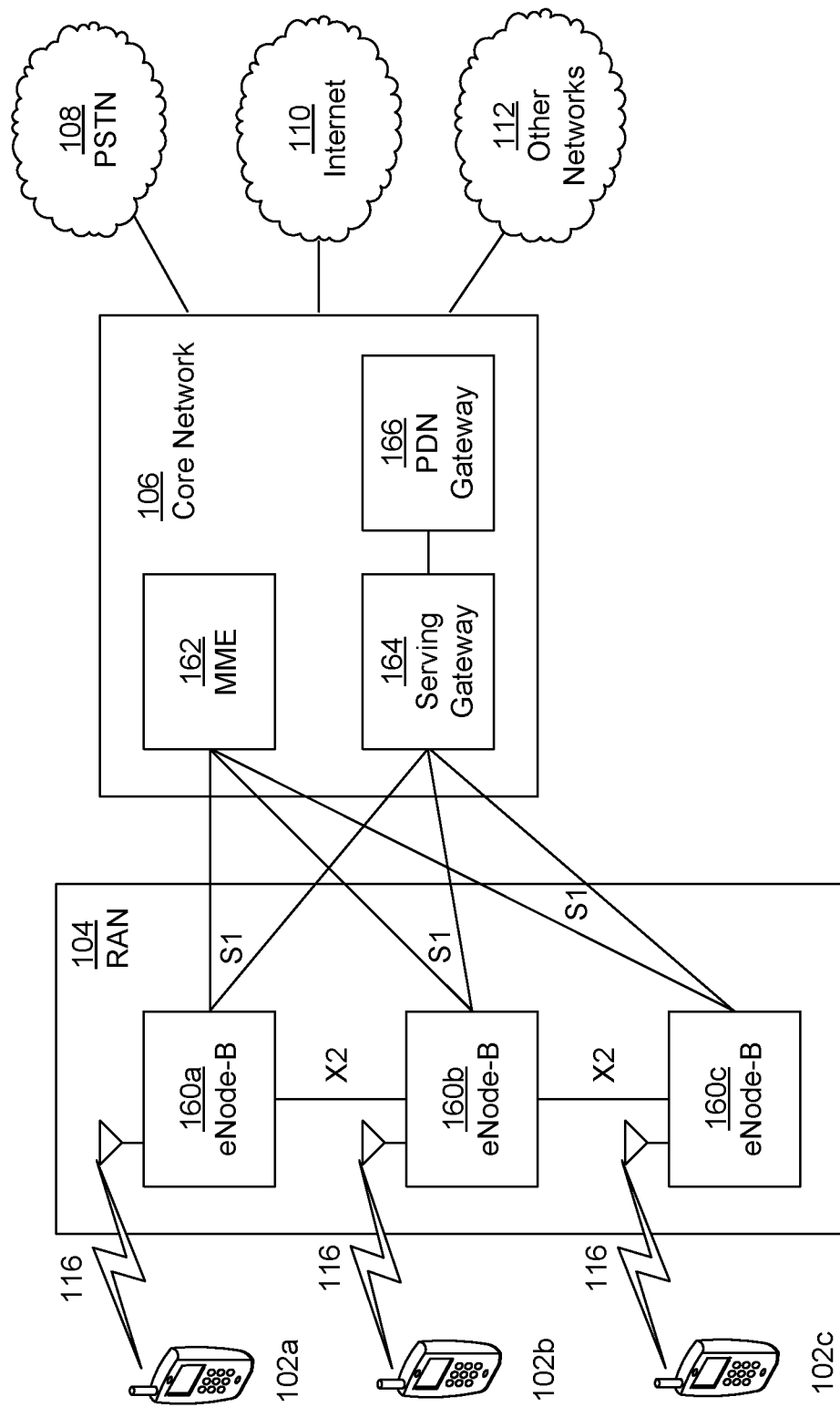

FIG. 1D is a system diagram of the RAN 104 and the core network 106 according to another embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
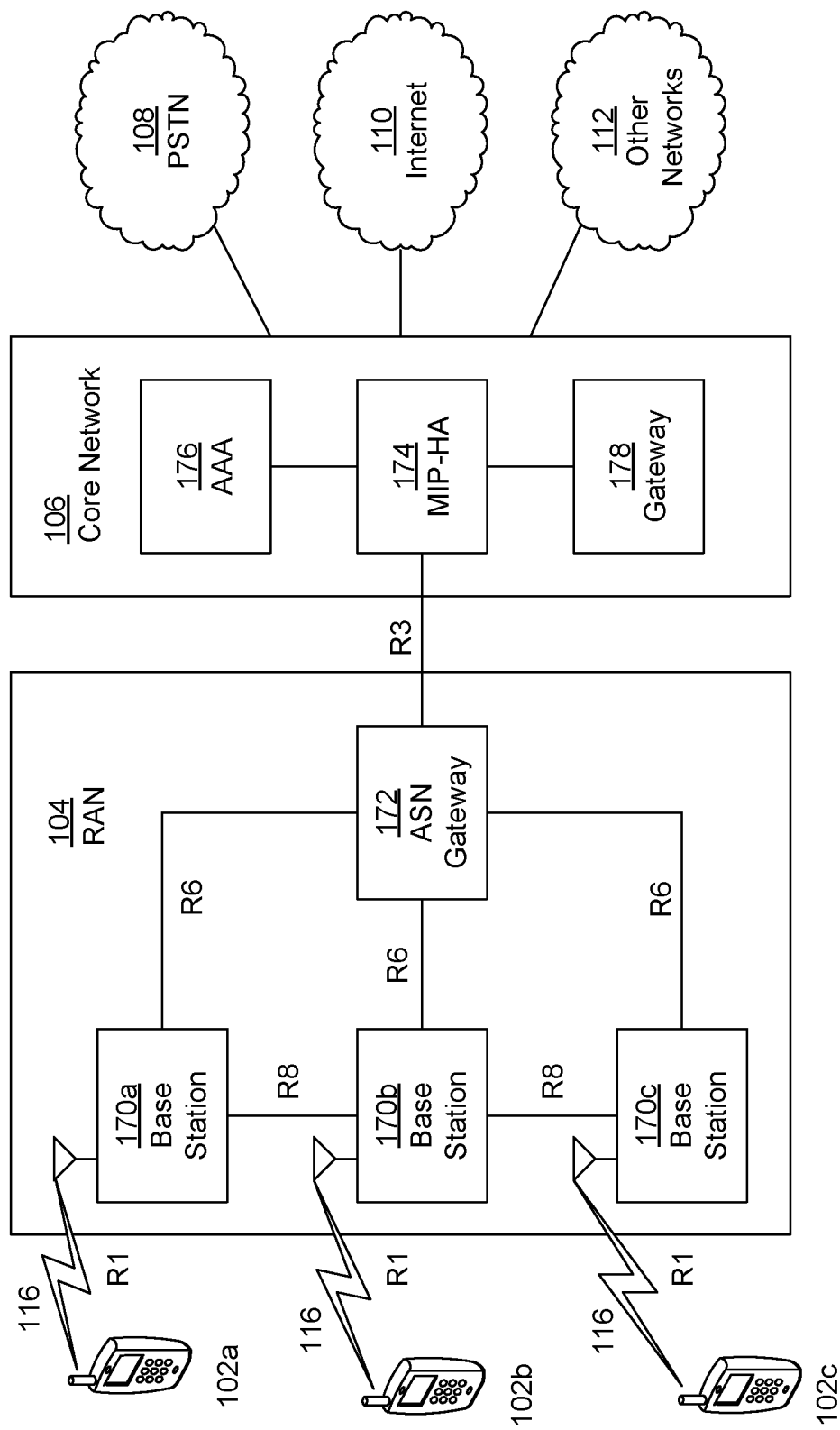

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, and 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, and 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, and 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, and 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 2:
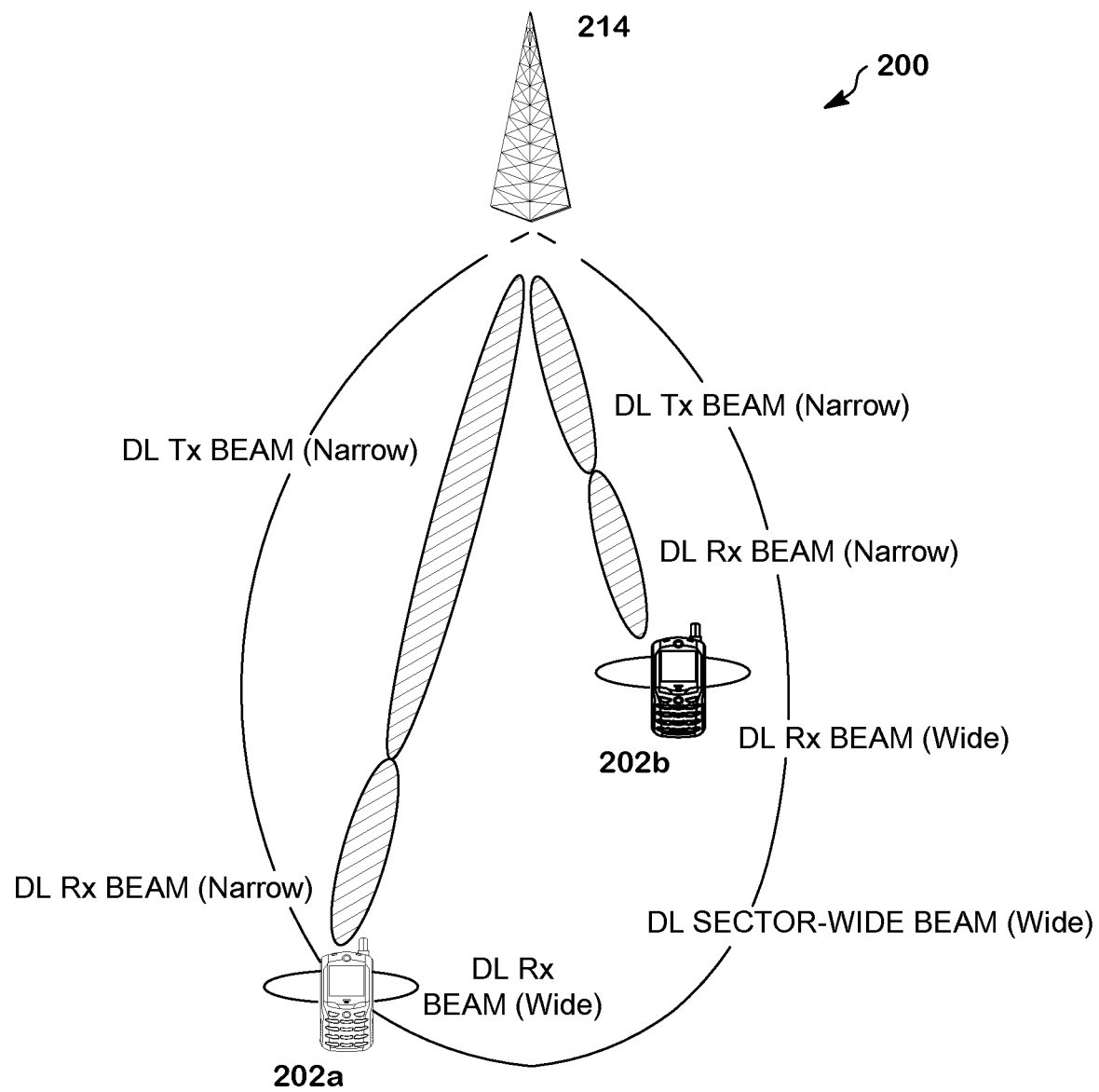
FIG. 2 illustrates an example environment in which embodiments may be practiced or implemented.

FIG. 2 illustrates an example communications system 200 in which embodiments may be practiced or implemented. The communications system 200 is provided for the purpose of illustration only and is not limiting of disclosed embodiments. As shown in FIG. 2, the communications system 200 includes a base station 214 and WTRUs 202a, 202b. As would be understood by a person of skill in the art, the communications system 200 may include additional elements not shown in FIG. 2.

The base station 214 may be any of the base stations 114 (FIG. 1A), Node-Bs 140 (FIG. 1C), eNode-Bs 160 (FIG. 1D) and base stations 170 (FIG. 1E), for example. The base station 214 may include functionality similar to, and/or different from, the base stations 114, Node-Bs 140, eNode-Bs 160 and base stations 170, as well. For example, the base station 214 may include functionality to support features of 5G and to implement the procedures, techniques, etc. included herein.

The base station 214 may be configured for small cell operation and/or deployment. The base station 214 may be configured to support any of centimeter wave (cmW) and millimeter wave (mmW) operation. For simplicity of exposition, the term "xmW" may be used herein to refer to any of cmW and mmW. The base station 214 may be additionally and/or alternatively configured to support various (e.g., all or some) functionality and/or features for small cell operation and/or deployment as specified in 3GPP Release 12 and newer releases. In this regard, the base station 214 may be capable of operating an xmW air interface in parallel, simultaneously and/or otherwise in connection with an LTE, LTE-A or like-type (collectively "LTE") air interface. The base station 214 may be equipped with at least one of various advanced antenna configurations and beamforming techniques, such as those that may allow the base station 214 to simultaneously transmit LTE downlink channels in a wide beam pattern and xmW channels in one or more narrow beam patterns. The base station 214 may also be configured to utilize an LTE uplink configuration adapted with features and procedures (e.g., those detailed herein) to support WTRUs that lack, or do not use their, xmW uplink transmission capabilities.

Each of the WTRUs 202a, 202b may be any of the WTRUs 102 (FIGS. 1A-1E), for example. Each of the WTRUs 202a, 202b may include functionality similar to, and/or different from, the WTRUs 102, as well. The WTRUs 202a, 202b may include functionality to support features of 5G and to implement the procedures, techniques, etc. included herein. For simplicity of exposition, when "WTRU 202" is used herein, it may refer to any of the WTRUs 202a, 202b.

Each of the WTRUs 202a, 202b may be configured to support xmW operation. The WTRUs 202a, 202b may be further configured to support various (e.g., all or some) functionality and/or features for user equipment operation and/or deployment as specified in 3GPP Release 12. Each of the WTRUs 202a, 202b may be capable of operating LTE and xmW air interfaces in parallel, simultaneously and/or otherwise in connection with each other. Each of the WTRUs 202a, 202b may have two sets of antennas and accompanying RF chains; one configured for operating in a LTE band and the other configured for operating in a xmW frequency band. However, the present disclosure is not limited thereto, and a WTRU may have any number of sets of antennas and accompanying RF chains. Each of the WTRUs 202a, 202b may include one or more baseband processors, and the baseband processors may include separate, or at least partially combined, functionality for baseband processing of the LTE frequency band and the xmW frequency band. The baseband processing functions may share hardware blocks for the xmW and LTE air interfaces, for example.

Introduction

The structure of an air interface may be one of the decisive factors for meeting performance goals of a wireless communication system. At the same time, designing an air interface may come with many challenges to meet various distinct performance goals, such as high spectral efficiency, robustness against channel conditions, utilization of user diversity, fast feedback mechanisms, low latency and less complexity at the transmitter and/or receiver.

Since waveforms for next generation high frequency communication systems over wideband channels may require low peak-to-average power ratio (PAPR) characteristics to achieve high power amplifier efficiency, single carrier waveforms may be better suited for management of power amplifier efficiency issues than multicarrier structures. On the other hand, traditional single carrier waveforms do not allow upper layers to harness multi-user diversity effectively. Considering the aforementioned issues, waveforms that allow block and/or block-based (collectively "block-based") transmissions (i.e., limited in both time and frequency domains), such as cyclic prefix (CP) orthogonal frequency division multiplexing (OFDM) (CP-OFDM), CP single-carrier (SC), discrete Fourier transform (DFT) spread OFDM (DFT-s-OFDM) and generalized frequency division multiplexing (GFDM), may be candidates for next generation wireless communication systems. These waveforms may allow for utilization of low-complexity equalizers with Fourier transforms, support multiple users and multiple antenna systems, and offer good time containment.

Many of the candidate waveforms incorporate redundancy into their structures by adding a CP into (i.e., appending as a prefix to each symbol in) each block prior to transmission. The addition of the CP converts what would otherwise be a linear convolution of a transmit signal and a channel impulse response into circular convolution of the same. The circular convolution permits frequency domain equalization (FDE), which in turn, allows for lower complexity receiver structures. The CP, however, causes underutilization of symbol energy for each block (e.g., CP+OFDM symbol) received at a receiver (as a result of the receiver discarding the CP of each received block) and causes extra power consumption for each block transmitted from a transmitter (e.g., as a result of carrying out cyclic prefixing after symbol generation).

The use of a rectangular pulse shape for OFDM signals and the use of cyclic prefixing for conventional DFT-s-OFDM signals introduce high spectral out-of-band (OOB) leakage due to discontinuous transitions between consecutive blocks of the signals. In addition, the PAPR of OFDM symbols is high due to simultaneous transmission of multiple information. While OOB leakage causes adjacent channel interference, high peak power signals cause dramatic distortion of the OFDM symbols due to non-linear hardware characteristics.

Various variants of the conventional DFT-s-OFDM waveform that eschew CP or other external guard interval functionality in lieu of an internal guard period (e.g., pursuant to a unique word (UW) sequence) while maintaining the benefits of an external guard interval have been suggested. One these variants is zero tail (ZT) DFT-s-OFDM, which has a number of disadvantages. For example, the tail parts of ZT DFT-s-OFDM symbols cause inter-symbol interference, and link-level performance degrades drastically in multipath channels for high-order modulations. Other solutions that suppress the tail, e.g. Perturbated Static DFT-s-OFDM, increase the transmitter complexity.

Overview

This disclosure is drawn, inter alia, to methods, apparatuses, systems, devices, and computer program products directed to unique word (UW) discrete Fourier transform (DFT) spread and shaped orthogonal frequency division multiplexing (OFDM) ("UW DFT-S-S-OFDM") based communications. Among new methodologies and/or technologies provided herein is a method that may be implemented in transmitter and that may include any of: transforming a set of data symbols and a UW sequence into a frequency domain ("$f_{DOM}$") signal using a DFT; replicating the $f_{DOM}$ signal so as to form a plurality of $f_{DOM}$ signal instances, wherein the plurality of $f_{DOM}$ signal instances is inclusive of the $f_{DOM}$ signal; shaping one or more of the plurality of $f_{DOM}$ signal instances; combining the plurality of $f_{DOM}$ signal instances to form a combined $f_{DOM}$ signal; transforming the combined $f_{DOM}$ signal into a block-based signal using an inverse DFT (IDFT); and outputting the block-based signal.

Among new methodologies and/or technologies provided herein is a method that may be implemented in transmitter and that may include any of: transforming a set of data symbols and a UW sequence into a $f_{DOM}$ signal using a DFT; replicating the $f_{DOM}$ signal so as to form an expanded $f_{DOM}$ signal; shaping the expanded $f_{DOM}$ signal; transforming the shaped, expanded $f_{DOM}$ signal into a block-based signal using an IDFT; shaping one or more time domain samples of the block-based signal; and outputting the block.

Among new methodologies and/or technologies provided herein is a method that may be implemented in transmitter and that may include transforming a set of data symbols and a UW sequence into a $f_{DOM}$ signal using a DFT; replicating the $f_{DOM}$ signal so as to form an expanded $f_{DOM}$ signal; distorting (shaping) the expanded $f_{DOM}$ signal in a frequency domain and/or a counterpart block-based signal in a time domain to (i) suppress time domain samples that contribute to inter-symbol interference; (ii) cause a decay of a UW signal disposed in a tail of the block-based signal; and (iii) provide contiguity between the UW signal and a second UW signal of a another block-based signal.

Pursuant to the new methodologies and technologies provided herein a UW DFT-S-S-OFDM waveform and corresponding transmitter and/or receiver structures configured for communications based on the UW DFT-S-S-OFDM waveform may mitigate ISI without using or, alternatively, modifying the inherent filter in conventional DFT-s-OFDM, i.e., Dirichlet sinc function. In some embodiments, the transmitter and/or receiver structures configured for communications based on the UW DFT-S-S-OFDM waveform may convert circular convolution for data symbols to linear convolution. This conversion, like circular convolution of a channel, may allow for utilization of frequency domain equalization (FDE) at a receiver without using external guard interval functionality.

In an embodiment, the transmitter configured for communications based on the UW DFT-S-S-OFDM waveform may distort (shape) in a frequency domain and/or a time domain signals produced using the Dirichlet sinc function to mitigate ISI and/or PAPR. In an embodiment, the distortion may control (e.g., suppress) the ringing effect of Dirichlet sinc function in time to mitigate ISI.

In an embodiment, the transmitter configured for communications based on the UW DFT-S-S-OFDM waveform may circularly shift time domain samples to mitigate ISI from tail parts of signals. By circularly shifting such time domain signals, a main lobe of a pulse shape for data symbols may be kept in a first (e.g., non-tail) part of a block-based signal.

In an embodiment, UW DFT-S-S-OFDM waveform and corresponding transmitter and/or receiver structures configured for communications based on the UW DFT-S-S-OFDM waveform may allow linear pulse shaping for data symbols and circular pulse shaping for UW symbols so as to maintain contiguity between the symbols (e.g., maximally).

In an embodiment, the UW DFT-S-S-OFDM waveform and corresponding transmitter and/or receiver structures configured for communications based on the UW DFT-S-S-OFDM waveform may produce a guard interval between data parts in adjacent UW DFT-S-S-OFDM symbols, which may mitigate inter-symbol interference (ISI) and interferences due to time misalignment between transmitters.

In an embodiment, the corresponding transmitter and/or receiver structures configured for communications based on the UW DFT-S-S-OFDM waveform may generate UW DFT-S-S-OFDM signals with circular convolution of the channel without the use of a cyclic prefix (CP), low peak-to-average power ratio (PAPR), and low out-of-band (OOB) emission. In addition, by generating a UW sequence at an input of a DFT process, simpler receiver operation may be obtained. In an embodiment, the UW DFT-S-S-OFDM waveform and corresponding transmitter and/or receiver structures configured for communications based on the UW DFT-S-S-OFDM waveform may allow frequency selective link adaption via DFT-spread based physical resource block. The UW DFT-S-S-OFDM waveform and corresponding transmitter and/or receiver structures configured for communications based on the UW DFT-S-S-OFDM waveform may also support multiple accessing scenarios in the uplink and downlink.

For clarity of exposition herein, matrices [columns vectors] may be denoted with upper [lower] case boldface letters (e.g., A and [a]). Hermitian operation and the transpose operation may be denoted by $(\bullet)^H$ and $(\bullet)^T$, respectively. Moore-Penrose pseudoinverse operation and inverse operation may be denoted by $(\bullet)^\dagger$ and $(\bullet)^{-1}$, respectively. Operation of $\|\bullet\|_2$ is the 2-norm of its argument. The trace of a square matrix may be represented by $tr(\bullet)$. The operations of $*$ and $\circledast$ refer to linear and circular convolution, respectively. The field of complex numbers, the field of real numbers, and the set of integer numbers may be referred to as $\mathbb{C}$, $\mathbb{R}$, and $\mathbb{Z}$, respectively. $I_N$, $0_{N \times M}$, and $1_N$ are the N×N identity matrix, N×M zero matrix, and N×1 vector where all entries are set to 1.

Representative Transmitter Example

Figure 3:
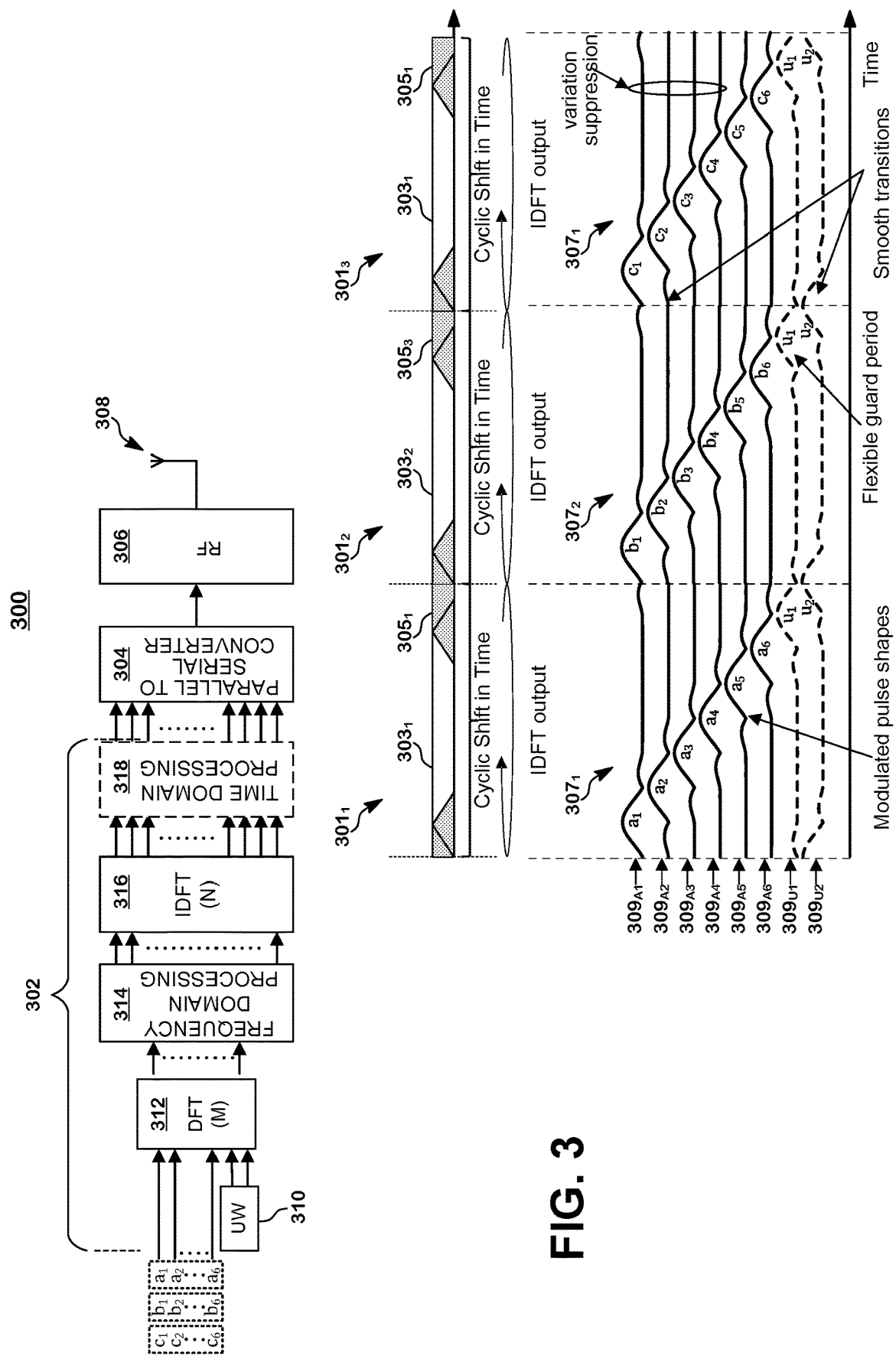
FIG. 3 is a block diagram illustrating a representative example of a transmitter in which one or more embodiments may be practiced and/or implemented.

FIG. 3 is a block diagram illustrating a representative example of a transmitter 300 in which one or more embodiments may be practiced and/or implemented. The transmitter 300 may be configured to generate and/or transmit one or more block-based signals. The transmitter 300 may include various structures, including a waveform generator configured for UW DFT-S-S-OFDM based communications ("UW DFT-S-S-OFDM waveform generator") 302, a parallel-to-serial converter 304, an RF unit 306 and one or more antennas (collectively "antenna 308").

The UW DFT-S-S-OFDM waveform generator 302 may include an M-point DFT unit 312, a frequency domain processing unit 314 and an N-point IDFT unit 316. The UW DFT-S-S-OFDM waveform generator 302 may also include a time domain processing 318. The UW DFT-S-S-OFDM waveform generator 302 may also include a generator ("UW generator") 310 configured to generate a UW or other fixed sequence (collectively, "UW sequence"). The UW generator 310 may generate the UW sequence based on pre-configured information and/or information provided via layer 1 and/or upper layer signaling.

The UW DFT-S-S-OFDM waveform generator 302 may be fed a set of data symbols, and may generate a block-based signal defining a data domain that includes the (temporally ordered) set of data symbols and a tail (internal guard interval) that includes a UW signal corresponding to a UW sequence generated by the UW generator 310. For example, the UW DFT-S-S-OFDM waveform generator 302 may generate block-based signals $301_{1-3}$ from respective sets of data symbols, $\{a_1 \ldots a_6\}$, $\{b_1 \ldots b_6\}$, $\{c_1 \ldots c_6\}$, and a UW sequence, $\{u_1, u_2\}$ (i.e., respective copies of the same UW sequence).

The block-based signals $301_{1-3}$ may define respective data domains $303_{1-3}$ and tails $305_{1-3}$. The data domain $303_1$ may include the data symbols, $a_1 \ldots a_6$, temporally ordered starting with data symbol, $a_1$, and the tail $305_1$ may include a UW signal corresponding to the UW sequence, $\{u_1, u_2\}$. The data domain $303_2$ may include the data symbols, $b_1 \ldots b_6$, temporally ordered starting with data symbol, $b_1$, and the data domain $303_3$ may include the data symbols, $c_1 \ldots c_6$, temporally ordered starting with data symbol, $c_1$. The tails $305_{2-3}$ may include respective UW signals; each of which corresponds to the UW sequence, $\{u_1, u_2\}$.

Example decompositions of the block-based signals $301_{1-3}$ are shown at $307_{1-3}$. The block-based signal $301_1$, as decomposed, may include time domain signals $309_{A1} \ldots 309_{A6}$, $309_{U1}$ and $309_{U2}$ corresponding to the data symbols, $a_1 \ldots a_6$, and the UW sequence, $\{u_1, u_2\}$, respectively. Similarly, the block-based signal $301_2$, as decomposed, may include time domain signals corresponding to the data symbols, $b_1 \ldots b_6$, and the UW sequence, $\{u_1, u_2\}$, and the block-based signal $301_3$, as decomposed, may include time domain signals corresponding to the data symbols, $c_1 \ldots c_6$, and the UW sequence, $\{u_1, u_2\}$.

The UW DFT-S-S-OFDM waveform generator 302 may form the time domain signals $309_{A1} \ldots 309_{A6}$, $309_{U1}$ and $309_{U2}$ in connection with generating the block-based signal $301_1$. Similarly, the UW DFT-S-S-OFDM waveform generator 302 may form the time domain signals in connection with generating the block-based signal $301_2$, and may form the time domain signals in connection with generating the block-based signal $301_3$.

The N-point IDFT unit 316 may be configured with a configurable IDFT having a configurable size, N ("N-point IDFT"), and may include a corresponding a number of inputs ("IDFT inputs"). The N-point IDFT may be configured as a single matrix. Alternatively, the N-point DFT may include a plurality of matrices that collectively represent the single matrix. The plurality of matrices may be obtained through various techniques including, for example, carrying out decomposition of the single matrix. The plurality of matrices may be used in lieu of the single matrix to enable implementation with fast algorithm processing structures.

The IDFT inputs may correspond, on a one-to-one basis, to a set of subcarriers (frequency bins). The set of subcarriers ("subcarrier set") may include one or more of: all subcarriers of a specific or specified (e.g., system) bandwidth, all available subcarriers within a specific or specified bandwidth, one or more assigned (allocated) subcarriers, some of the subcarriers of a specific or specified bandwidth, some of the available subcarriers within a specific or specified bandwidth, a random or other selection of one or more subcarriers. The N-point IDFT unit 316 may also include one or more outputs ("IDFT outputs") from which block-based signals may be output on a block-by-block basis.

The M-point DFT unit 312 may be configured with a configurable DFT having a configurable size, M ("M-point DFT"), and may include a corresponding a number of inputs ("DFT inputs"). The M-point DFT may be a single matrix. Alternatively, the M-point DFT may include a plurality of matrices that collectively represent the single matrix. The plurality of matrices may be obtained through various techniques including, for example, carrying out decomposition of the single matrix. The plurality of matrices may be used in lieu of the single matrix to enable implementation with fast algorithm processing structures.

The DFT inputs and the IDFT inputs may be ordered and/or arranged so as to temporally order the data symbols and the UW signal within the data domain and the tail, respectively, of a block-based signal. For example, the DFT inputs and the IDFT inputs may be ordered and/or arranged such that the data symbols, $a_1 \ldots a_6$, and the UW sequence, $\{u_1, u_2\}$, fed to DFT inputs 1-8 (assuming M=8) may be temporally ordered within a block-based signal 301 starting with data symbol, $a_1$, followed by the rest of the data symbols, $a_2 \ldots a_6$, in order, and then the UW signal. For simplicity of exposition herein, the terms "upper DFT inputs" and "lower DFT inputs" may refer to dynamically configured partitions of the DFT inputs, where the (i) upper DFT inputs may be fed a set of data symbols (e.g., $\{a_1 \ldots a_6\}$) to position the data symbols within the data domain (with or without temporal ordering), and (ii) the lower DFT inputs may be fed the UW sequence (e.g., $\{u_1, u_2\}$) to generate a UW signal at the tail.

The M-point DFT unit 312 may transform the set of data symbols and the UW sequence (collectively "data-symbol block") into a $f_{DOM}$ signal using the M-point DFT, and may feed (output) the $f_{DOM}$ signal to the frequency domain processing unit 314.

The frequency domain processing unit 314 may receive the $f_{DOM}$ signal. The frequency domain processing unit 314 may replicate the $f_{DOM}$ signal a number of times so as to form an expanded $f_{DOM}$ signal. The number of times (that the frequency domain processing unit 314 may replicate the received $f_{DOM}$ signal) may be, or be based on, a repetition factor. The repetition factor may be based on effecting a corresponding amount of up-sampling of the data symbols and/or UW sequence in the time domain, e.g., to facilitate a subsequent shaping operation. The corresponding amount of up-sampling may be expressed as an up-sampling factor. The up-sampling factor may be, for example, a ratio of the IDFT size, N, to the DFT size, M, or $$\frac{N}{M} \in \mathbb{Z}.$$

The repetition factor may be $$\frac{N}{M_k} - x \in \mathbb{Z},$$

where x is greater than or equal to 1.

The frequency domain processing unit 314 may shape the expanded $f_{DOM}$ signal to form a shaped $f_{DOM}$ signal. In an embodiment, the frequency domain processing unit 314 may shape (e.g., modify) one or more frequency domain samples of the expanded $f_{DOM}$ signal to mitigate (a) inter-symbol interference from counterpart time domain samples (e.g., disposed in the tail) of a block-based signal and belonging to time domain signals that correspond to data symbols; and/or (b) PAPR. The frequency domain processing unit 314, for example, may weight the expanded $f_{DOM}$ signal with a desired frequency response of a counterpart time domain filter. In an embodiment, the desired frequency response may be configured as a set of frequency coefficients, and the frequency domain processing unit 314 may apply the frequency coefficients to one or more frequency domain samples of the expanded $f_{DOM}$ signal.

Alternatively, the frequency domain processing unit 314 may weight the expanded $f_{DOM}$ signal with the desired frequency response of a counterpart time domain filter and (e.g., together with) a phase adjustment to effect a cyclic shift in the time domain. The frequency coefficients (weights) may be configured as complex coefficients, e.g., a set of frequency coefficients generated (e.g., by frequency domain processing unit 314) from multiplying frequency coefficients that provide the desired frequency response with a phase shift (e.g., complex) signal that provides a phase adjustment to effect a cyclic shift in the time domain.

The frequency domain processing unit 314 may map (e.g., determine a mapping of) the shaped $f_{DOM}$ signal to the subcarrier set. The frequency domain processing unit 314 may feed the shaped $f_{DOM}$ signal to the IDFT inputs of the N-point IDFT unit 316 based on the mapping. The N-point IDFT unit 316 may receive the shaped $f_{DOM}$ signal. The N-point IDFT unit 316 may transform the shaped $f_{DOM}$ signal into a (time domain) block-based signal using the N-point IDFT. The N-point IDFT unit 316 may feed (output) the block-based signal to the parallel-to-serial converter 304 or, alternatively, to the time domain processing unit 318. The time domain processing unit 318 may process the block-based signal in the time domain to further filter and/or cyclically shift or further cyclically shift the time domain samples of the block-based signal. The time domain processing unit 318 may feed the block-based signal after time domain processing to the parallel-to-serial converter 304.

The parallel-to-serial converter 304 may receive and carryout conversion of the block-based signal. The parallel-to-serial converter 304 may feed the converted block-based signal to the RF unit 306. The RF unit 306 may receive and may carryout RF processing on the converted block-based signal. The RF unit 306 may transmit the processed block-based signal via the antenna 308.

Figure 4:
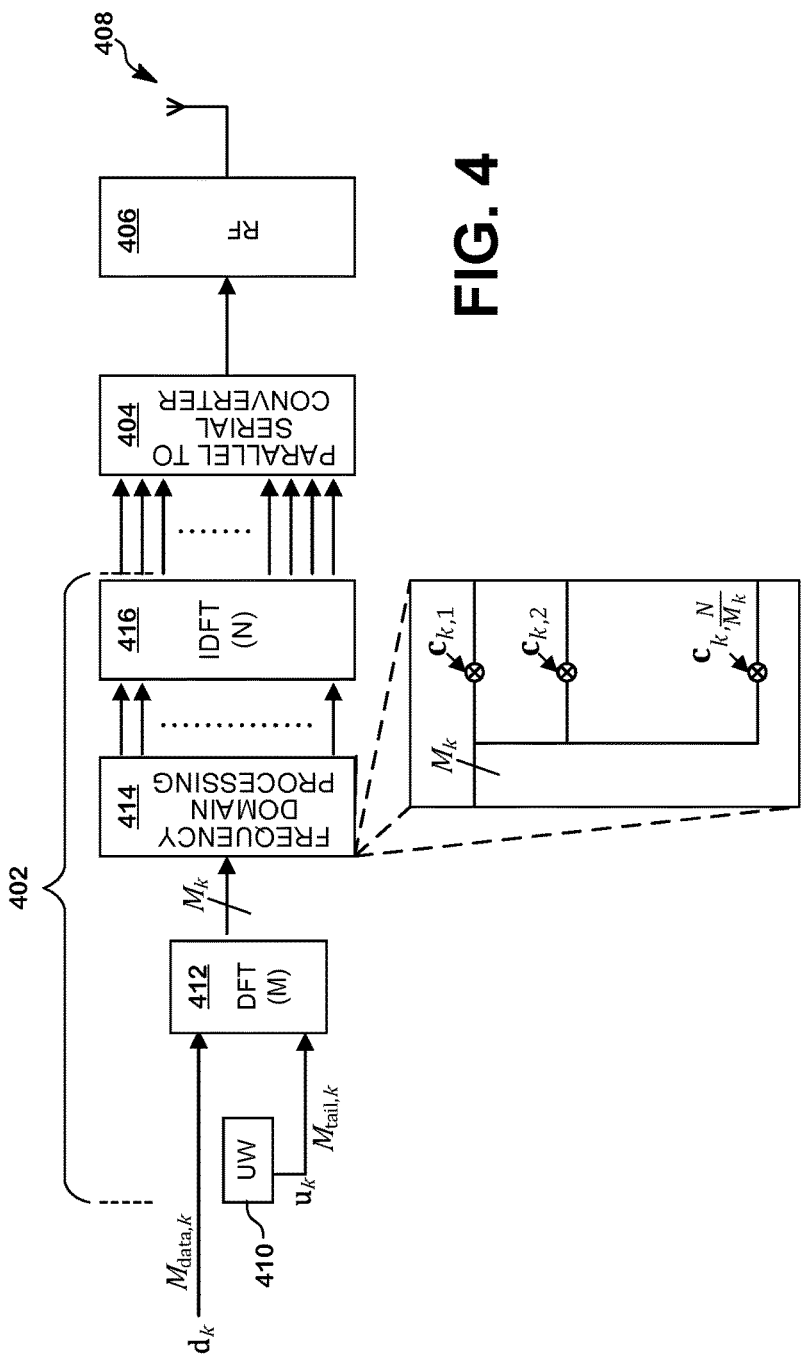
FIG. 4 is a block diagram illustrating a representative example of a transmitter in which one or more embodiments may be practiced and/or implemented.

FIG. 4 is a block diagram illustrating a representative example of a transmitter 400 in which one or more embodiments may be practiced and/or implemented. The transmitter 400 may be configured to generate and/or transmit a block-based signal. The transmitter 400 may include various structures, including a UW DFT-S-S-OFDM waveform generator 402, a parallel-to-serial converter 404, an RF unit 406 and one or more antennas (collectively "antenna 408").

The UW DFT-S-S-OFDM waveform generator 402 may include an M-point DFT unit 412, a frequency domain processing unit 414 and an N-point IDFT unit 416. The UW DFT-S-S-OFDM waveform generator 402 is similar to the UW DFT-S-S-OFDM waveform generator 302 (FIG. 3), and may include a time domain processing unit (not shown). The UW DFT-S-S-OFDM waveform generator 402 may also include a UW generator 410. The UW generator 410 may generate a UW sequence based on pre-configured information and/or information provided via layer 1 and/or upper layer signaling.

The N-point IDFT unit 416 may be configured with a configurable N-point IDFT, and may include a corresponding a number of IDFT inputs. The N-point IDFT may be configured as a single matrix, $F^H \in \mathbb{C}^{N \times N}$ where N indicates the size of the IDFT. Alternatively, the N-point DFT may include a plurality of matrices that collectively represent the single matrix, $F^H \in \mathbb{C}^{N \times N}$. The plurality of matrices may be obtained through various techniques including, for example, carrying out decomposition of the single matrix, $F^H \in \mathbb{C}^{N \times N}$. The plurality of matrices may be used in lieu of the single matrix, $F^H \in \mathbb{C}^{N \times N}$ to enable implementation with fast algorithm processing structures.

The IDFT inputs may correspond, on a one-to-one basis, to a subcarrier set (frequency bins). The subcarrier set may include one or more of: all subcarriers of a specific or specified (e.g., system) bandwidth, all available subcarriers within a specific or specified bandwidth, one or more assigned (allocated) subcarriers, some of the subcarriers of a specific or specified bandwidth, some of the available subcarriers within a specific or specified bandwidth, a random or other selection of one or more subcarriers. The N-point IDFT unit 416 may also include one or more IDFT outputs from which block-based signals may be output on a block-by-block basis.

The M-point DFT unit 412 may be configured with a configurable M-point DFT, and may include a corresponding a number of DFT inputs. The M-point DFT may be a single matrix, $D_k \in \mathbb{C}^{M_k \times M_k}$, where $M_k$ indicates the size of the DFT. Alternatively, the M-point DFT may include a plurality of matrices that collectively represent the single matrix, $D_k \in \mathbb{C}^{M_k \times M_k}$. The plurality of matrices may be obtained through various techniques including, for example, carrying out decomposition of the single matrix, $D_k \in \mathbb{C}^{M_k \times M_k}$. The plurality of matrices may be used in lieu of the single matrix, $D_k \in \mathbb{C}^{M_k \times M_k}$ to enable implementation with fast algorithm processing structures.

The DFT inputs may be dynamically partitioned into upper DFT inputs and lower DFT inputs. The upper DFT inputs may be fed a block of (e.g., QAM modulated) data symbols to be transmitted, denoted as vector, $d_k \in \mathbb{C}^{M_{data,k} \times 1}$, where $M_{data,k}$ indicates the number of data symbols to be transmitted. The lower DFT inputs may be fed (by the UW generator 410) a UW sequence, denoted as $u_k \in \mathbb{C}^{M_{tail,k} \times 1}$ to generate a UW signal at a tail of a block-based signal. The M-point DFT unit 412 may transform the block of symbols, $d_k$, and the UW, $u_k$, into a $f_{DOM}$ signal using the M-point DFT, and may feed (output) the $f_{DOM}$ signal to the frequency domain processing unit 414.

The frequency domain processing unit 414 may receive the $f_{DOM}$ signal. The frequency domain processing unit 414 may replicate the received $f_{DOM}$ signal a number of times to form a plurality of $f_{DOM}$ signal instances. The plurality of $f_{DOM}$ signal instances may include the received $f_{DOM}$ signal and one or more replications of the $f_{DOM}$ signal. The number of times (that the frequency domain processing unit 414 may replicate the received $f_{DOM}$ signal) may be, or be based on, a repetition factor. The repetition factor may be based on effecting a corresponding amount of up-sampling of the data symbols (the elements of the vector $d_k$) and/or UW sequence in the time domain, e.g., to facilitate a subsequent shaping operation. The corresponding amount of up-sampling may be expressed as an up-sampling factor. The up-sampling factor may be, for example, a ratio of the IDFT size, N, to the DFT size, $M_k$, or $$\frac{N}{M_k} \in \mathbb{Z},$$

and the repetition factor may be $$\frac{N}{M_k} - x \in \mathbb{Z},$$

where x is greater than or equal to 1. Details of a proof showing that replicating the received $f_{DOM}$ signal a number of times to form the plurality of $f_{DOM}$ signal instances results in up-sampling of the data symbols and UW sequence in the time domain may be found in Appendix A.

The frequency domain processing unit 414 may shape some or all of the $f_{DOM}$ signal instances. In an embodiment, the frequency domain processing unit 414 may shape (e.g., modify) one or more frequency domain samples of some or all of the $f_{DOM}$ signal instances to mitigate (a) inter-symbol interference from counterpart time domain samples (e.g., disposed in the tail) of a block-based signal and belonging to time domain signals that correspond to data symbols; and/or (b) PAPR. The frequency domain processing unit 414, for example, may weight the $f_{DOM}$ signal instances with a desired frequency response of a counterpart time domain filter. In an embodiment, the desired frequency response may be configured as a set of frequency coefficients, and the frequency domain processing unit 414 may apply the frequency coefficients to one or more frequency domain samples of the $f_{DOM}$ signal instances.

Alternatively, the frequency domain processing unit 414 may weight the some or all of the $f_{DOM}$ signal instances with the desired frequency response of a counterpart time domain filter and (e.g., together) with a phase adjustment to effect a cyclic shift in the time domain. The frequency coefficients (weights) may be configured as complex coefficients, e.g., a set of frequency coefficients generated (e.g., by frequency domain processing unit 414) from multiplying frequency coefficients that provide the desired frequency response with a phase shift (e.g., complex) signal that provides a phase adjustment to effect a cyclic shift in the time domain.

As another alternative, the frequency domain processing unit 414 may perform frequency-domain windowing on the plurality of $f_{DOM}$ signal instances. The frequency domain processing unit 414 may perform frequency-domain windowing in various ways. For example, the frequency domain processing unit 414 may multiply or convolve the plurality of $f_{DOM}$ signal instances with a filter having frequency response that suppresses one or more samples of one or more of the plurality of $f_{DOM}$ signal instances (e.g., samples that contribute to inter-symbol interference). Alternatively and/or additionally, the frequency domain processing unit 414 may multiply the plurality of $f_{DOM}$ signal instances with a frequency response of a time domain filter (i) having sidelobes lower/smaller than a Dirichlet sinc function and/or that (ii) replaces or modifies (e.g., suppresses and/or reduces the sidelobes of) the Dirichlet sinc function inherent in the DFT operation.

The time domain filter used by the frequency domain processing unit 414 may have a length ("filter length"). The filter length may be less than or equal to a number of time domain samples that corresponds to an internal guard interval of a block-based signal (e.g., to facilitate suppression of time domain samples (e.g., disposed in the tail) of the block-based signal and belonging to time domain signals that correspond to data symbols). Alternatively, the filter length may be less than or equal to a number of time domain samples as a function of the up-sampling factor.

In an embodiment, the filter may be defined as $f_k \in \mathbb{C}^{L\times 1}$, where $L \leq N$ is the filter length. One consequence of using the filter is a more generic DFT-s-OFDM structure (e.g., as compared to conventional DFT-s-OFDM) in that it provides an ability to control the pulse shape of the block-based signals. The frequency domain processing unit 414 may effect the filtering operation in the time domain by point-to-point multiplying, in the frequency domain, the plurality of $f_{DOM}$ signal instances with a frequency response of the filter, $f_k \in \mathbb{C}^{L\times 1}$. The frequency response of the filter (also referred to herein as a "frequency domain filter") may be calculated as:

$$c_k = F \begin{bmatrix} f_k \\ 0_{N-L} \end{bmatrix} = \begin{bmatrix} c_{k,1} \\ c_{k,2} \\ \vdots \\ c_{k,\frac{N}{M_k}} \end{bmatrix}, \quad (1)$$

where $$c_k \in \mathbb{C}^{N\times 1} = \begin{bmatrix} c_{k,1}^T & \cdots & c_{k,i}^T & \cdots & c_{k,\frac{N}{M_k}}^T \end{bmatrix}^T$$

defines filter coefficients in frequency and $c_{k,i} \in \mathbb{C}^{M_k \times 1}$. The mapping of a kth $f_{DOM}$ signal instance to a kth subset of the subcarrier set may be expressed as:

$$X_k = \underbrace{\text{diag}\{c_k\}}_{\text{point-to-point multiplications with windowing}} \bigg( \underbrace{1_{\frac{N}{M_k}}}_{\text{repetitions}} \otimes \underbrace{D_k \begin{bmatrix} d_k \\ u_k \end{bmatrix}}_{\text{DFT-spread}} \bigg) \quad (2)$$

where $X_k \in \mathbb{C}^{N\times 1}$ defines the kth $f_{DOM}$ signal instance that may be fed to the IDFT inputs corresponding to the kth subcarrier subset.

The point-to-point multiplication in frequency domain by UW DFT-S-S-OFDM waveform generator 402 may yield a circular convolution of the filter, $f_k \in \mathbb{C}^{L\times 1}$ with upsampled data symbols in the time domain. In an embodiment, the circular convolution may lead (be converted) to a linear convolution when the block-based signal and the filter are padded with an appropriate amount of zero samples in the time domain. Details of an example procedure for carrying out this conversion may be found in Appendix B.

A linear convolution of the filter and the data symbols may be carried out by the UW DFT-S-S-OFDM transmitter 400 (and the impact of the data symbols on the tail part of the block-based signals may be controlled with the filter) on condition that the UW sequence, $u_k$ is configured as a zero vector ($u_k = 0_{M_{tail,k}}$), and that the filter length is configured according to:

$$L \leq \frac{N}{\frac{M_k}{N_{up,k}}} \times M_{tail,k}. \quad (3)$$

Figure 5:
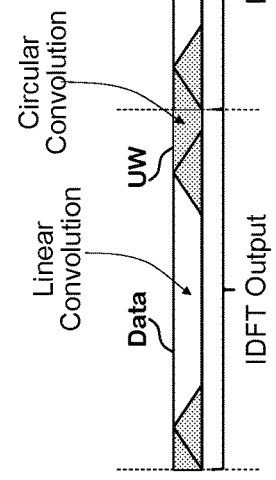
FIG. 5 is a block diagram illustrating a representative example of waveform according to an embodiment.

If a non-zero valued UW sequence is used ($u_k \neq 0_{M_{tail,k}}$), the UW DFT-S-S-OFDM transmitter 400 may carry out linear convolution of the filter and the data symbols and circular convolution of the filter and the UW signal (e.g., as illustrated in FIG. 5).

The UW DFT-S-S-OFDM transmitter 400 may provide block-based operation with contiguity between the adjacent time domain symbols due to the UWs of the adjacent symbols having the same circular convolution structure for the UW. As a result, the UW DFT-S-S-OFDM transmitter 400, inherently, is able to synthesize single carrier structures.

A traditional DFT-s-OFDM signal may be synthesized by the UW DFT-S-S-OFDM transmitter 400. For example, the UW DFT-S-S-OFDM transmitter 400 may use filter coefficients, $c_k$, that provide a localized mapping from the DFT outputs to the IDFT inputs. The filter coefficients, $c_k$, may be configured as i.e.

$$c_k = \left(1, \underbrace{\ldots}_{M_k 1s}, 1, 0, \ldots 0\right),$$

for instance.

The frequency domain processing unit 414 may combine the plurality of $f_{DOM}$ signal instances to form a combined $f_{DOM}$ signal. The frequency domain processing unit 414, for example, may combine the plurality of $f_{DOM}$ signal instances by mapping them to the subcarrier set corresponding to the IDFT inputs. The frequency domain processing unit 414 may map the plurality of $f_{DOM}$ signal instances to a respective plurality of subsets ("subcarrier subsets") of the subcarrier set. In an embodiment, at least one of the subcarrier subsets is not mutually exclusive from at least one other of the subcarrier subsets. Alternatively, each subcarrier subset is adjacent to, and non-overlapping with, at least one other subcarrier subset.

The frequency domain processing unit 414 may feed the combined $f_{DOM}$ signal to the IDFT inputs of the N-point IDFT unit 416 based on the mappings. The N-point IDFT unit 416 may receive the combined $f_{DOM}$ signal. The N-point IDFT unit 416 may transform the combined $f_{DOM}$ signal into a (time domain) block-based signal using the N-point IDFT. The N-point IDFT unit 416 may feed (output) the block-based signal to the parallel-to-serial converter 404.

The parallel-to-serial converter 404 may receive and carryout conversion of the block-based signal. The parallel-to-serial converter 404 may feed the converted block-based signal to the RF unit 406. The RF unit 406 may receive and carryout RF processing on the converted block-based signal. The RF unit 406 may transmit the processed block-based signal via the antenna 408.

Figure 6:
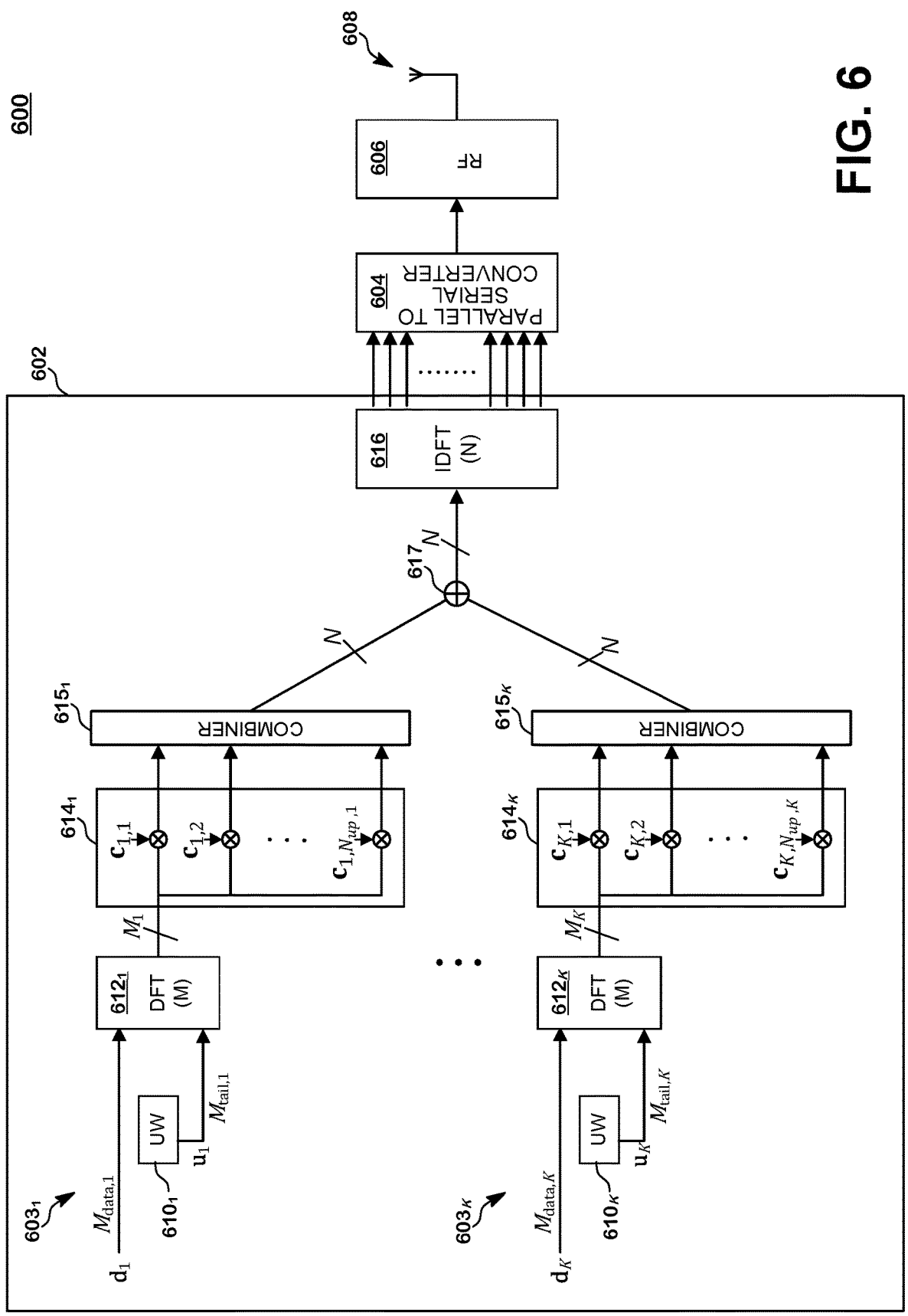
FIG. 6 is a block diagram illustrating a representative example of a transmitter in which one or more embodiments may be practiced and/or implemented.

FIG. 6 is a block diagram illustrating a representative example of a transmitter 600 in which one or more embodiments may be practiced and/or implemented. The transmitter 600 may be configured to generate and/or transmit a block-based signal. The transmitter 600 may include various structures, including a UW DFT-S-S-OFDM waveform generator 602, a parallel-to-serial converter 604, an RF unit 606 and one or more antennas (collectively "antenna 608"). The UW DFT-S-S-OFDM waveform generator 602 is similar to the UW DFT-S-S-OFDM waveform generator 402 (FIG. 4), except that it extends the UW DFT-S-S-OFDM waveform generator 402 (FIG. 4) to support a plurality of M-point DFT units and frequency domain processing units that may operate simultaneously (or substantially simultaneously).

The UW DFT-S-S-OFDM waveform generator 602 may include a configurable number, K, of frequency domain signal generators $603_{1-k}$, an adder 617 and an N-point IDFT unit 616. Each frequency domain signal generator 603 may include a UW generator 510, an M-point DFT unit 612, a frequency domain processing unit 614 and a frequency domain signal combiner 615. Each of the UW generators $610_{1-k}$ may be configured and/or function in the same way as the UW generator 412 (FIG. 4). Each of the M-point DFT units $612_{1-k}$ may be configured and/or function in the same way as the M-point DFT unit 412 (FIG. 4). Each of the frequency domain processing units $614_{1-k}$ may be configured and/or function in the same way as the frequency domain processing unit 414 (FIG. 4).

For simplicity of exposition in the description that follows, only the frequency domain signal generators $603_1$ and $603_k$ are described. One of ordinary skill in the art will recognize that frequency domain signal generators $603_2$-$603_{k-1}$ may be configured and/or function in the same way as the frequency domain signal generators $603_1$ and/or $603_k$.

The M-point DFT units $612_1$, $612_k$ may output respective $f_{DOM}$ signals, $M_1$, $M_k$. The frequency domain processing units $614_1$, $614_k$ may receive the $f_{DOM}$ signals, $M_1$, $M_k$. The frequency domain processing unit $614_1$ may replicate the $f_{DOM}$ signal, $M_1$, a number of times (e.g., by a replication factor) to form a plurality of $M_1$-signal instances. The frequency domain processing unit $614_1$ may shape each of the $M_1$-signal instances, and may map the $M_1$-signal instances to respective subsets of a subcarrier set. The frequency domain processing unit $614_1$ may feed the $M_1$-signal instances to the frequency domain signal combiner $615_1$ in accordance with the mapping. The frequency domain signal combiner $615_1$ may receive the $M_1$-signal instances, and may combine, concatenate or otherwise arrange the received $M_1$-signal instances in accordance with the mapping so as to form a combined $M_1$-signal. The frequency domain signal combiner $615_1$ may feed the combined $M_1$-signal to the adder 617.

The frequency domain processing unit $614_k$ may replicate the $f_{DOM}$ signal, $M_k$, a number of times (e.g., by a replication factor) to form a plurality of $M_k$-signal instances. The frequency domain processing unit $614_k$ may shape each of the $M_k$-signal instances, and may map the $M_k$-signal instances to respective subsets of the subcarrier set. The frequency domain processing unit $614_k$ may feed the $M_k$-signal instances to the frequency domain signal combiner $615_k$ in accordance with the mapping. The frequency domain signal combiner $615_k$ may receive the $M_k$-signal instances, and may combine, concatenate or otherwise arrange the received $M_k$-signal instances in accordance with the mapping so as to form a combined $M_k$-signal. The frequency domain signal combiner $615_k$ may feed the combined $M_k$-signal to the adder 617.

The adder 617 may receive the combined $M_1$-signal and the combined $M_k$-signal. The adder 617 may add the combined $M_1$-signal and the combined $M_k$-signal in the frequency domain to form a combined $M_{1-k}$ signal. The adder 617 may feed the combined $M_{1-k}$ signal to the N-point IDFT unit 616.

The N-point IDFT unit 616 may receive the combined $M_{1-k}$ signal. The N-point IDFT unit 616 may transform the combined $M_{1-k}$ signal using the N-point IDFT so as to form a block-based signal. The block-based signal in the time domain may be expressed as:

$$x = F^H \sum_{k=1}^{K} X_k = F^H \sum_{k=1}^{K} \text{diag}\{c_k\} \left( \underbrace{1_{\frac{N}{M_k}} \otimes \underbrace{D_k \begin{bmatrix} d_k \\ u_k \end{bmatrix}}_{DFT-spread}}_{\text{repetitions}} \right) \quad (4)$$

$$\underbrace{\phantom{xxxxxxxxxxxxxxxxxxxxxxxxxxxxxxxxx}}_{\text{point-to-point multiplications (windowing)}}$$
$$\underbrace{\phantom{xxxxxxxxxxxxxxxxxxxxxxxxxxxxxxxxxxxx}}_{\text{overlapping in frequency}}$$
$$\underbrace{\phantom{xxxxxxxxxxxxxxxxxxxxxxxxxxxxxxxxxxxxxx}}_{\text{Time-domain conversion by IDFT}}$$

where $x \in \mathbb{C}^{N \times 1}$ may be a signal vector to be transmitted.

The N-point IDFT unit 616 may feed (output) the block-based signal to the parallel-to-serial converter 604. The parallel-to-serial converter 604 may receive and carryout conversion of the block-based signal. The parallel-to-serial converter 604 may feed the converted block-based signal to the RF unit 606. The RF unit 606 may receive and carryout RF processing on the converted block-based signal. The RF unit 606 may transmit the processed block-based signal via the antenna 608.

The UW DFT-S-S-OFDM waveform may exhibit one or more of the following:
(1) Flexible UW: The lower-end inputs of the M-point DFT units may be used for the UW symbols. Assuming no precoder, the UW duration may be adjusted flexibly by changing the length of $u_k$. In addition, the waveform might not use the UW for the demodulation of the data symbols; the consequence of which may be improvement of robustness to channel estimation errors.
(2) Low OOB leakage: The impact of data symbols at the tail may gradually decay and reach zero at the end of the block-based signal. The UWs of adjacent block-based signals may complement each other due to circular convolution. And contiguity between adjacent block-based signals may be achieved maximally.
(3) Low energy at the tail of the symbols: The impact of data symbols at the tail may gradually decay and may reach zero at the end of the block-based signal with filtering, and immunity against ISI may be achieved.

Example Windowing Methods/Options

The transmitter may use the frequency response of the time domain filter in different ways to adjust trade-offs between adjacent channel interference and tail energy. Example approaches for this may be as follows:
1) Exact approach—the frequency response of the time domain filter remains unmodified and point-to-point multiplication (windowing) may be performed with the repeated signal exactly.
2) Clipping approach—the frequency response of the time domain filter may be intentionally clipped in frequency. The clipping may be done based on a threshold. Less significant samples may be discarded, e.g., multiplying by zero valued weights. This approach may allow a trade-off between an amount of energy at the tail and adjacent channel interference due to the sidelobes of the filter.

Figure 7:
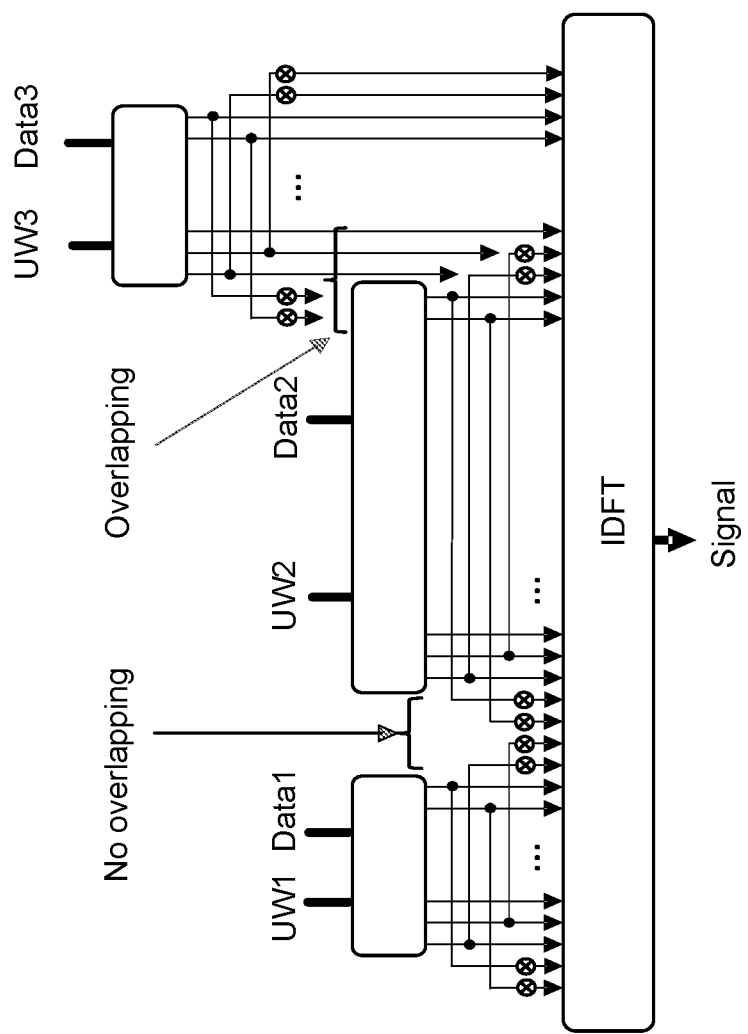
FIG. 7 is a block diagram illustrating a representative example of transmitter structures adapted for pulse shaping using exact and/or clipping approaches.

In both approaches, the amplitude of a main lobe of the frequency response of the filter may intentionally be fixed to 1 (or maximally flat), but the sidelobes may gradually decay with the filter coefficients. FIG. 7 illustrates examples of the exact approach and the clipping approach. In FIG. 7, arrows pointing to the same input/subcarrier of the N-point IDFT unit may be summed together.

Figure 8:
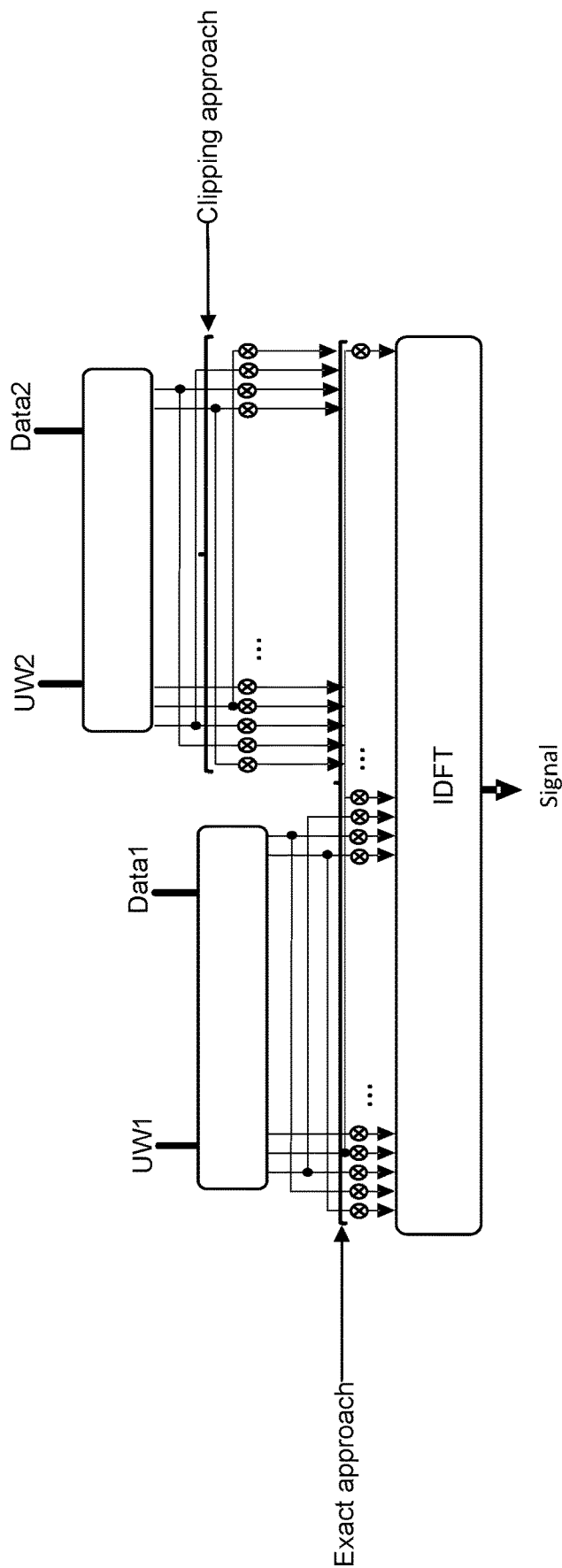
FIG. 8 is a block diagram illustrating a representative example of transmitter structures adapted for pulse shaping using a clipping with fixed main lobe approach.

In an embodiment, the decaying region of filters applied to $f_{DOM}$ signal instances generated from different $f_{DOM}$ signals may overlap or not overlap to increase spectral efficiency. FIG. 8 illustrates a clipping approach with fixed main lobe and an exact (e.g., non-overlapping) approach. In FIG. 8, arrows pointing to the same input/subcarrier of the N-point IDFT unit may be summed together.

Example Intentional Cyclic Shift

The frequency coefficients $c_k$ may be configured such that they cyclically shift symbols in the time domain (to control ISI, for example). The data domain signal at the output of the IDFT unit may have large values at the edges of the block. The large values may persist after carrying out a windowing operation (e.g., without other processing and/or shaping). These large values may leak into a next block and may create ISI. A process to prevent this may be to circularly shift the time domain signal and reduce the amplitude of the signal at the edges of the block. Since a time domain shift is equivalent to changing the phase of the signal in frequency domain, the process can be carried out by multiplying the frequency coefficients $c_k$ with an appropriate signal to get $c_k e^{-j2\pi k l/N}$, where l is the amount of cyclic time shift and N is the IDFT size.

Example Receiver Structure

At the receiver, operations applied at a transmitter may be reversed or counteracted by considering an impact of the communication channel. Different receiver architectures are possible. In an embodiment, the receiver architecture may be configured to support a traditional DFT-s-OFDM waveform (referred to herein as a "DFT-s-OFDM receiver" for simplicity of exposition). In an alternative embodiment, the receiver architecture may be configured to support a DFT-s-OFDM waveform using a matched filter (referred to herein as a "matched-filter DFT-s-OFDM receiver" for simplicity of exposition).

Figure 9:
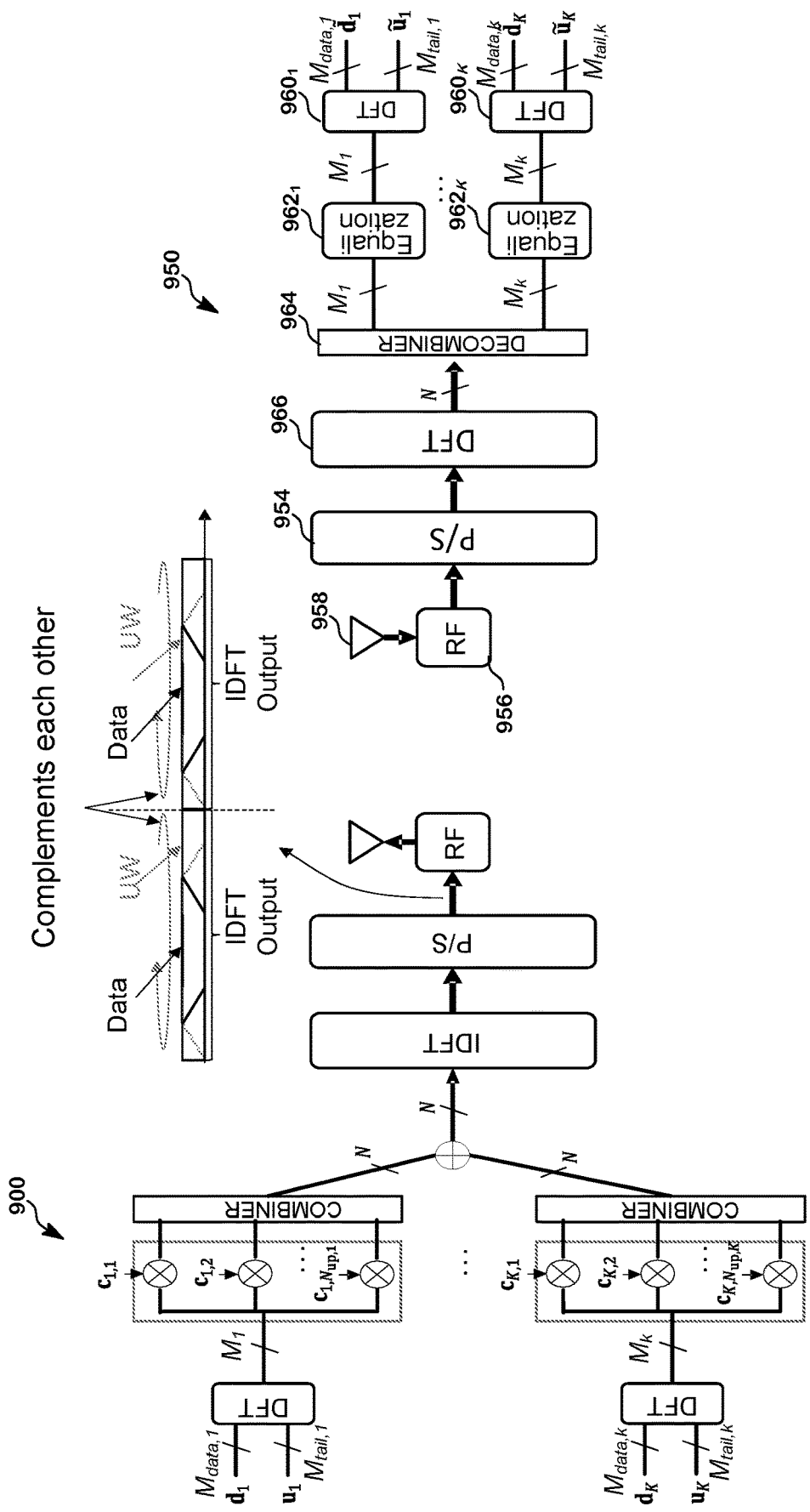
FIG. 9 is a block diagram illustrating a representative example of DFT-s-OFDM receiver in which one or more embodiments may be practiced and/or implemented.

FIG. 9 is a block diagram illustrating a representative example of a traditional DFT-s-OFDM receiver 950 in which one or more embodiments may be practiced and/or implemented. The DFT-s-OFDM receiver 950 may be configured receive a block-based signal generated and/or transmitted from a transmitter 900 configured with a UW DFT-S-S-OFDM waveform generator, such as the transmitter 600 of FIG. 6. The DFT-s-OFDM receiver 950 may include various structures, including one or more antennas (collectively "antenna 958"), an RF unit 956, a parallel-to-serial converter 954, an N-point IDFT unit 966, a de-combiner unit 964, FDE units $962_{1-k}$ and M-point DFT units $960_{1-k}$.

The DFT-s-OFDM receiver 950 may use channel estimation and equalization to negate the impact of the filter on the block-based signal when, for example, the windowing coefficients used to generate the block-based signal are complex (e.g., resulting in cyclic shifted data symbols and/or UW signals in the time domain). The DFT-s-OFDM receiver 950 may use interleaved pilots when, for example, the frequency domain windowing does not modify the phases of the $f_{DOM}$ signal instances or the phase of the combined $f_{DOM}$ signal (e.g., in view of the methodologies and techniques provided herein do not result in a change in smoothness of an effective channel response).

Figure 10:
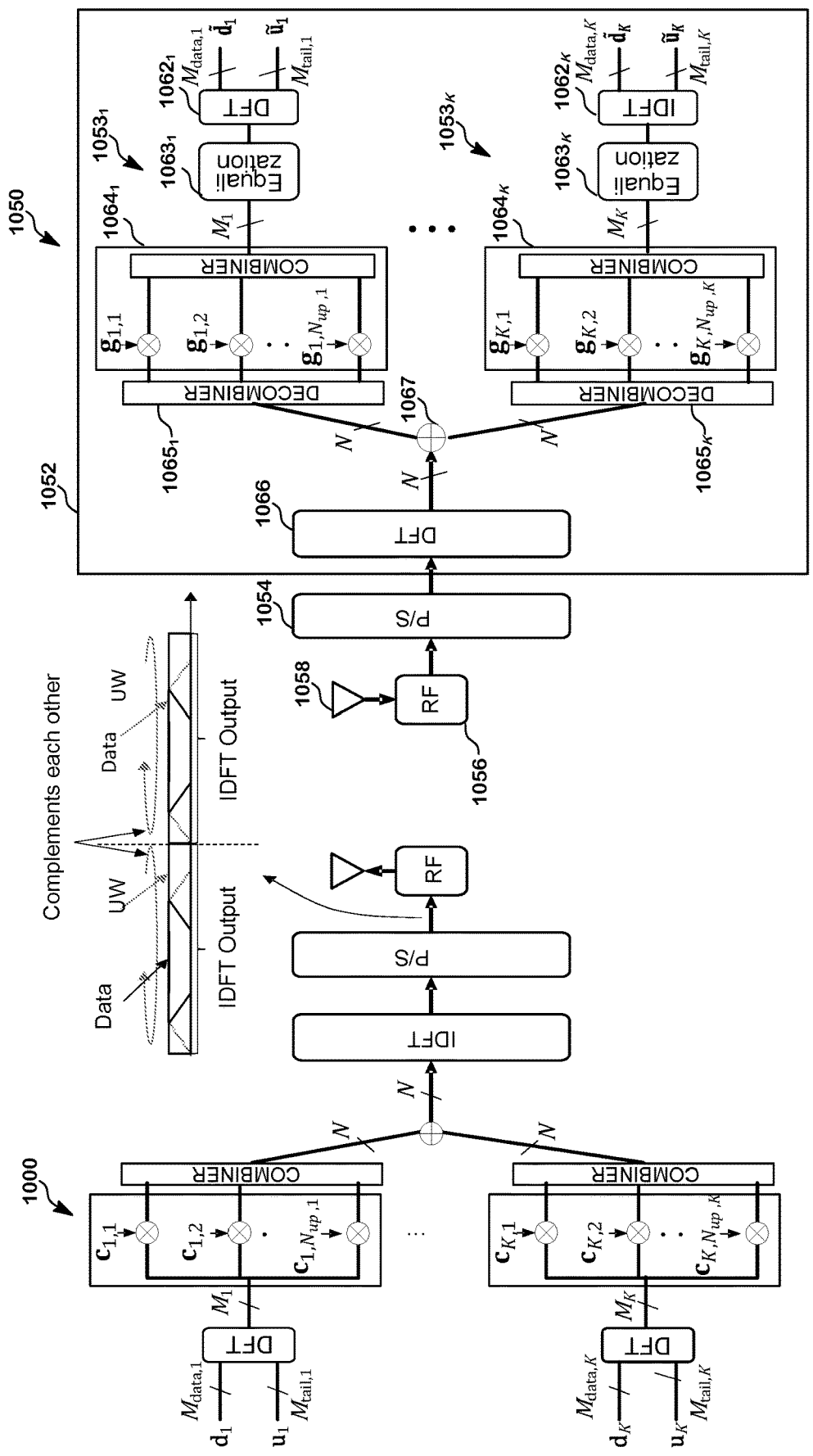
FIG. 10 is a block diagram illustrating a representative example of a matched-filter DFT-s-OFDM receiver in which one or more embodiments may be practiced and/or implemented.

FIG. 10 is a block diagram illustrating a representative example of a matched-filter DFT-s-OFDM receiver 1050 in which one or more embodiments may be practiced and/or implemented. The matched-filter DFT-s-OFDM receiver 1050 may be configured receive a block-based signal generated and/or transmitted from a transmitter 1000 configured with a UW DFT-S-S-OFDM waveform generator, such as the transmitter 600 of FIG. 6. The matched-filter DFT-s-OFDM receiver 1050 may include various structures, including one or more antennas (collectively "antenna 1058"), an RF unit 1056, a parallel-to-serial converter 1054, and a matched-filter DFT-s-OFDM waveform decomposer 1052. The matched-filter DFT-s-OFDM waveform decomposer 1052 may include an N-point IDFT unit 1066, an adder 1067, and a configurable number, K, of frequency domain signal decomposers $1053_{1-k}$. Each frequency domain signal decomposer 1053 may include a frequency domain signal de-combiner 1065; a frequency domain processing unit 1064, including a combiner; a FDE unit 1063; and an M-point DFT unit 1062.

The matched-filter DFT-s-OFDM receiver 1050 may apply a matched filter, e.g., a conjugate of $c_k$, (e.g., to maximize SNR in frequency domain) when, for example, the receiver is configured with or is informed of the filter(s) used at the transmitter 1000. In a communication system, there may be a finite set of choices for $M_k$. For these specific values of $M_k$, the coefficients $c_k$ may be pre-calculated based on the time-domain filter coefficients $f_k$. From a receiver stand-point, once the resource allocation is signaled (i.e., for $M_k$), the receiver may use the pre-defined $c_k$ (and $c_{k,i}$) coefficients to configure the matched filter coefficients $g_k$.

Figure 11:
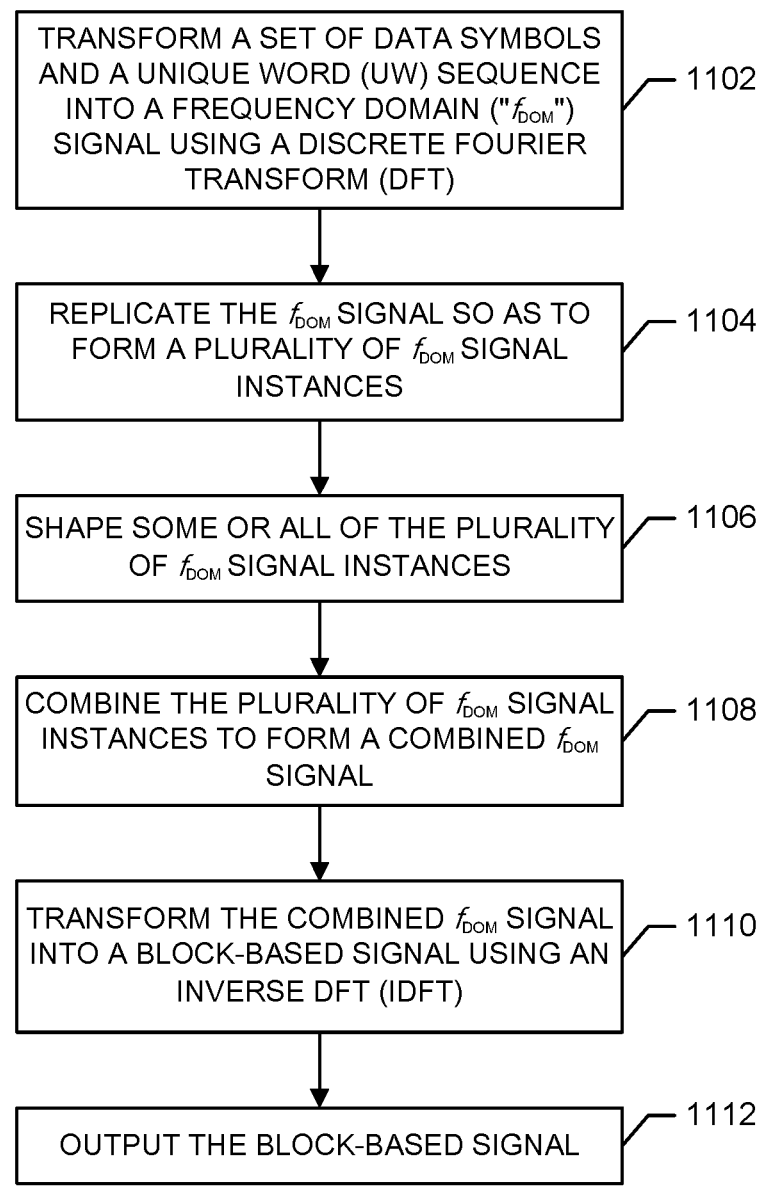
FIG. 11 is a flow diagram illustrating a representative procedure for supporting unique word (UW) discrete Fourier transform (DFT) spread and shaped orthogonal frequency division multiplexing (OFDM) ("UW DFT-S-S-OFDM") based communications.

FIG. 11 is a flow diagram illustrating a representative procedure 1100 for supporting UW DFT-S-S-OFDM based communications. The representative procedure 1100 may be implemented in a transmitter, such as the transmitter 300 (FIG. 3), the transmitter 400 (FIG. 4), the transmitter 600 (FIG. 6) or any other transmitter comprising circuitry, including a processor and a memory, configured to perform the representative procedure 1100.

Referring to FIG. 11, the transmitter may transform a set of data symbols and a UW sequence into a $f_{DOM}$ signal using a DFT (1102). Thereafter, the transmitter may replicate the received $f_{DOM}$ signal so as to form a plurality of $f_{DOM}$ signal instances (1104). One of the $f_{DOM}$ signal instances may be the received $f_{DOM}$ signal.

After the $f_{DOM}$ signal instances are formed, the transmitter may shape one or more of them (1106). The transmitter, for example, may filter one or more of the plurality of $f_{DOM}$ signal instances. Alternatively, the transmitter may perform frequency-domain windowing on the plurality of $f_{DOM}$ signal instances. In an embodiment, the transmitter may apply to the plurality of $f_{DOM}$ signal instances a respective plurality of components of a frequency domain filter. In an embodiment, the plurality of components of the frequency domain filter are rotated with a respective plurality of complex coefficients.

In an embodiment, the transmitter may perform frequency domain windowing, at least in part, by multiplying the plurality of $f_{DOM}$ signal instances with a filter having frequency response that suppresses one or more samples of one or more of the plurality of $f_{DOM}$ signal instances. In an embodiment, the filter may have a length that is less than or equal to a number of time domain samples that corresponds to an internal guard interval. In an embodiment, the internal guard interval may be based on an up-sampling factor, and the up-sampling factor may correspond to a ratio of the IDFT size to the DFT size. In an embodiment the transmitter may perform frequency domain windowing, at least in part, by multiplying or convolving the plurality of $f_{DOM}$ signal instances with a filter having sidelobes lower/smaller than a Dirichlet sinc function.

The transmitter may combine the $f_{DOM}$ signal instances to form a combined $f_{DOM}$ signal (1108), e.g., after shaping is completed. The transmitter may map the $f_{DOM}$ signal instances to a subcarrier set in connection with combining the $f_{DOM}$ signal instances. For example, prior to combining the $f_{DOM}$ signal instances, the transmitter may map the $f_{DOM}$ signal instances to a subcarrier set, and then combine the $f_{DOM}$ signal instances based on (according to) the mapping. In an embodiment, the transmitter may map the $f_{DOM}$ signal instances to respective subcarrier subsets of the subcarrier set. In an embodiment, at least one of the subcarrier subsets is not mutually exclusive from at least one other of the subcarrier subsets. In an embodiment, the transmitter may map the $f_{DOM}$ signal instances to respective adjacent, non-overlapping subcarrier subsets.

After the combined $f_{DOM}$ signal is formed, the transmitter may transform the combined $f_{DOM}$ signal into a block-based signal using an IDFT (1110). Thereafter, the transmitter may output the block-based signal (1112). In an embodiment, the plurality of $f_{DOM}$ signal instances may be a number, k, of instances, and the number, k, may correspond to a ratio of the IDFT size to the DFT size.

Figure 12:
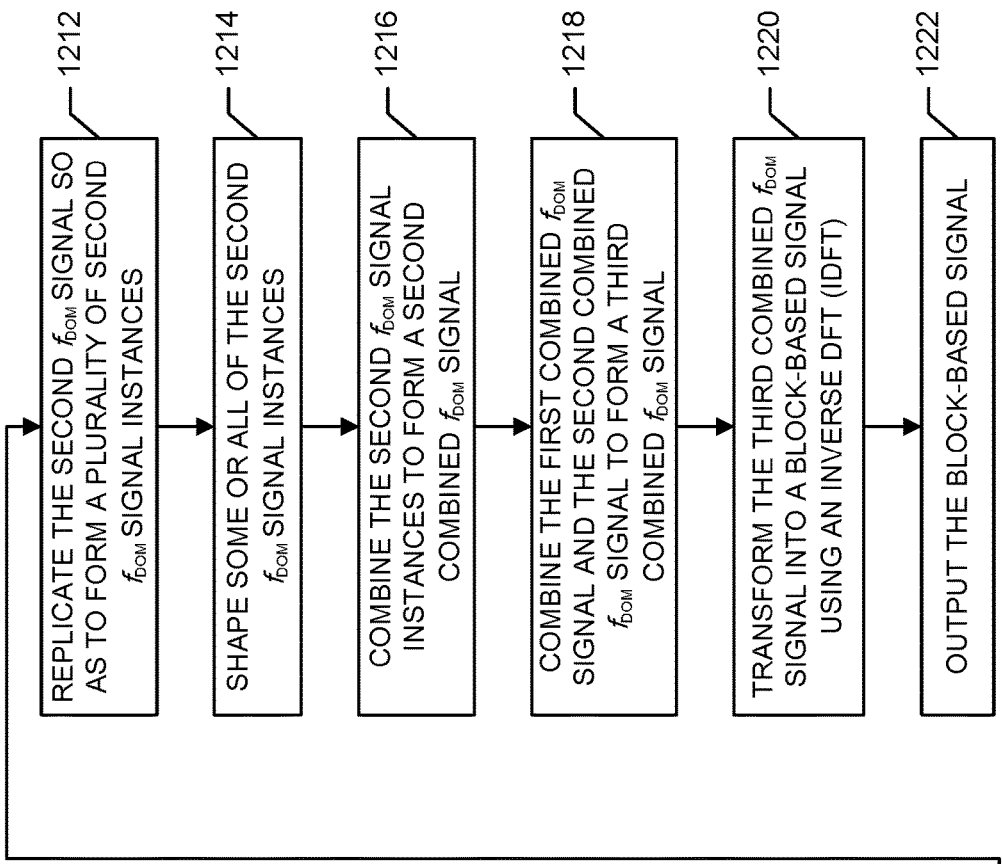
FIG. 12 is a flow diagram illustrating a representative procedure for supporting UW DFT-S-S-OFDM based communications.
Figure 12:
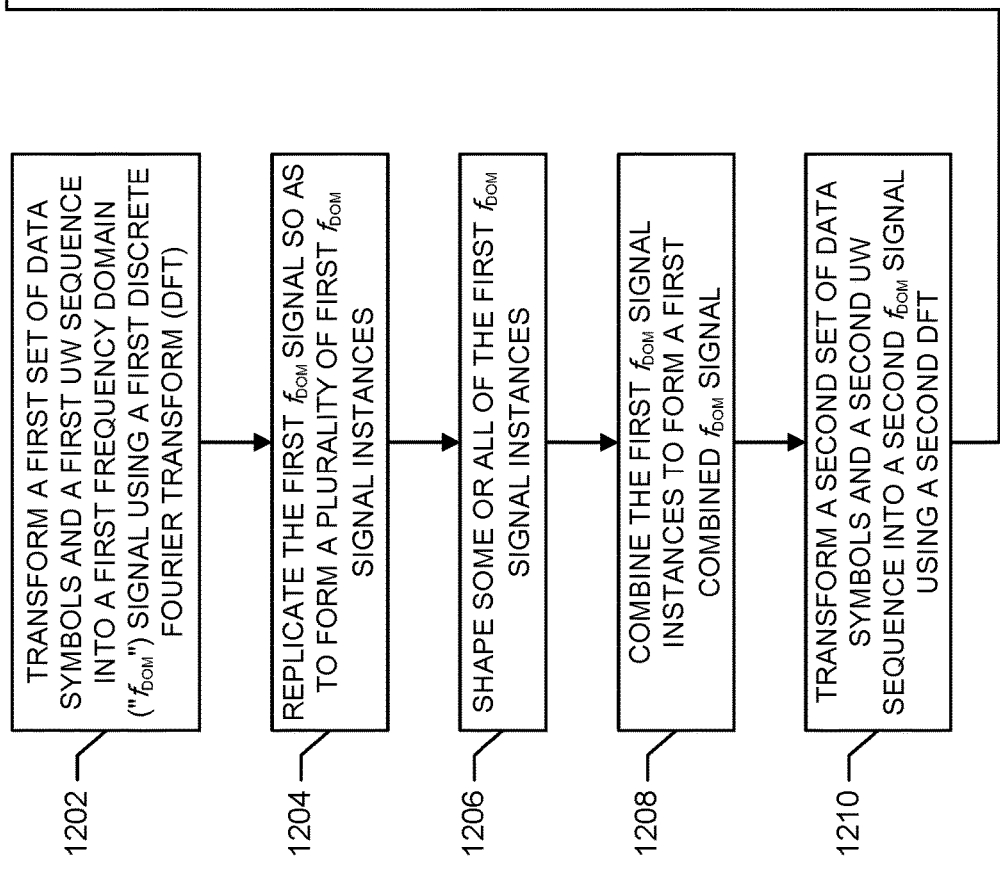

FIG. 12 is a flow diagram illustrating a representative procedure 1200 for supporting UW DFT-S-S-OFDM based communications. The representative procedure 1200 may be implemented in a transmitter, such as the transmitter 300 (FIG. 3), the transmitter 400 (FIG. 4), the transmitter 600 (FIG. 6) or any other transmitter comprising circuitry, including a processor and a memory, configured to perform the representative procedure 1200. The representative procedure 1200 may include various operations, and although shown sequentially in FIG. 12, at least the operations referred to by reference numerals 1202-1208 may be carried out simultaneously (e.g., within a common time frame) and/or in parallel with at least the operations referred to by reference numerals 1210-1216. In some instances, the transmitter may interleave or otherwise mix the operations referred to by reference numerals 1202-1208 with the operations referred to by reference numerals 1210-1216.

Referring to FIG. 12, the transmitter may transform a first set of data symbols and a first UWs sequence into a first $f_{DOM}$ signal using a first DFT (1202). Thereafter, the transmitter may replicate the first $f_{DOM}$ signal so as to form a plurality of first $f_{DOM}$ signal instances (1204). One of the first $f_{DOM}$ signal instances may be the received first $f_{DOM}$ signal.

After the first $f_{DOM}$ signal instances are formed, the transmitter may shape one or more of the first $f_{DOM}$ signal instances (1206). The transmitter, for example, may filter one or more of the first $f_{DOM}$ signal instances. Alternatively, the transmitter may perform frequency-domain windowing on the first $f_{DOM}$ signal instances. In an embodiment, the transmitter may apply to the first $f_{DOM}$ signal instances a respective plurality of components of a frequency domain filter. In an embodiment, the plurality of components of the frequency domain filter may be rotated with a respective plurality of complex coefficients.

In an embodiment, the transmitter may perform frequency domain windowing, at least in part, by multiplying the first $f_{DOM}$ signal instances with a filter having frequency response that suppresses one or more samples of one or more of the first $f_{DOM}$ signal instances. In an embodiment, the filter may have a length that is less than or equal to a number of time domain samples that corresponds to an internal guard interval. In an embodiment, the internal guard interval may be based on an up-sampling factor, and the up-sampling factor may correspond to a ratio of the IDFT size to the DFT size. In an embodiment the transmitter may perform frequency domain windowing, at least in part, by multiplying or convolving the first $f_{DOM}$ signal instances with a filter having sidelobes lower/smaller than a Dirichlet sinc function.

The transmitter may combine the first $f_{DOM}$ signal instances to form a first combined $f_{DOM}$ signal (1208), e.g., after shaping is completed. The transmitter may map the first $f_{DOM}$ signal instances to a subcarrier set in connection with combining the first $f_{DOM}$ signal instances. The transmitter may map the first $f_{DOM}$ signal instances to the subcarrier set, and then combine them based on (according to) the mapping. In an embodiment, the transmitter may map the first $f_{DOM}$ signal instances to respective subcarrier subsets of the subcarrier set. In an embodiment, at least one of the subcarrier subsets is not mutually exclusive from at least one other of the subcarrier subsets. In an embodiment, the transmitter may map the first $f_{DOM}$ signal instances to respective adjacent, non-overlapping subcarrier subsets.

The transmitter may transform a second set of data symbols and a second UW sequence into a second $f_{DOM}$ signal using a second DFT (1210). Thereafter, the transmitter may replicate the second $f_{DOM}$ signal so as to form a plurality of second $f_{DOM}$ signal instances (1212). One of the second $f_{DOM}$ signal instances may be the second $f_{DOM}$ signal.

After the second $f_{DOM}$ signal instances are formed, the transmitter may shape one or more of the second $f_{DOM}$ signal instances (1214). The second $f_{DOM}$ signal instances may be shaped by the transmitter in any of ways described herein, including the same way it shaped the first $f_{DOM}$ signal instances.

The transmitter may combine the second $f_{DOM}$ signal instances to form a second combined $f_{DOM}$ signal (1216), e.g., after shaping is completed. The second $f_{DOM}$ signal instances may be combined by the transmitter in any of ways described herein, including the same way it combined the first $f_{DOM}$ signal instances. In an embodiment, the transmitter may map the second $f_{DOM}$ signal instances to the same set of subcarriers it mapped the first $f_{DOM}$ signal instances to when combining the second $f_{DOM}$ signal instances.

After the first and second combined $f_{DOM}$ signals are formed, the transmitter may add the first combined $f_{DOM}$ signal and the second combined $f_{DOM}$ signal to form a third $f_{DOM}$ signal (1218). In an embodiment, the transmitter may add one or more samples of the first combined $f_{DOM}$ signals and one or more samples of the second combined $f_{DOM}$ signal, where the samples of the first combined $f_{DOM}$ signal and the samples of the second combined $f_{DOM}$ signal are mapped to the same subcarriers of the subcarrier set. In an embodiment, the transmitter may concatenate the first combined $f_{DOM}$ signal and the second combined $f_{DOM}$ signal, where the first combined $f_{DOM}$ signal is mapped to a first partition of the subcarrier of subcarriers and the second combined $f_{DOM}$ signal is mapped to a second partition of the subcarrier set.

In an embodiment, the transmitter may form the third $f_{DOM}$ signal by, at least in part, adding samples of the first combined $f_{DOM}$ signal and the second combined $f_{DOM}$ signal that are mapped to a common subset of the subcarrier set ("common-subcarrier subset"), and by appending to the added samples (i) one or more samples of the first combined $f_{DOM}$ signal mapped to subcarriers of a first subcarrier subset and not mapped to the common-subcarrier subset, and (ii) one or more samples of the second combined $f_{DOM}$ signal mapped to subcarriers of a second (i.e., different from the first) subcarrier subset and not mapped to the common-subcarrier subset.

After the third $f_{DOM}$ signal is formed, the transmitter may transform the third $f_{DOM}$ signal into a block-based signal using an IDFT (1220), and may output the block-based signal (1222).

Example Numerical Results

As an example, a UW DFT-S-S-OFDM waveform formed using frequency domain windowing ("a UW DFT-S-W-OFDM waveform") is compared with CP DFT-s-OFDM, ZT DFT-s-OFDM, and static DFT-s-OFDM waveforms through simulations discussed herein below. For the simulations, N=512 subcarriers, L=256, and a CP/UW length of 64 samples. Consider K=4 identical DFT units where $M_k$=64 for k=1, 2, ..., 4. For each DFT unit, $M_{tail,k}$=8, which yields $N_d = K \times M_k - K \times M_{tail,k} = 4 \times (64-8) = 224$ data symbols. The multipath channel is modeled as an exponential Rayleigh fading channel with $\mathcal{L} = N_{tail}+1$ independent taps and power delay profile (PDP) where the unnormalized power of the lth tap is expressed as exp(−τl), where τ corresponds to the decay rate. Note that τ=0 yields a uniform PDP. For filter length, root raised cosine filters are considered, where their filter lengths are 48 samples, which satisfies the aforementioned condition of $$L \le \frac{N}{\frac{M_k}{N_{up,k}}} \times M_{tail,k} = 64.$$

The oversampling rate and the roll-off factor for both filters are fixed to 8 and 0, respectively. The simulations consider clipping and non-overlapping approaches disclosed above and 4 subcarriers are used as guard bands between subcarrier subsets. The modulation order is set to 4QAM unless otherwise stated.

Example Time Samples

Figure 13:
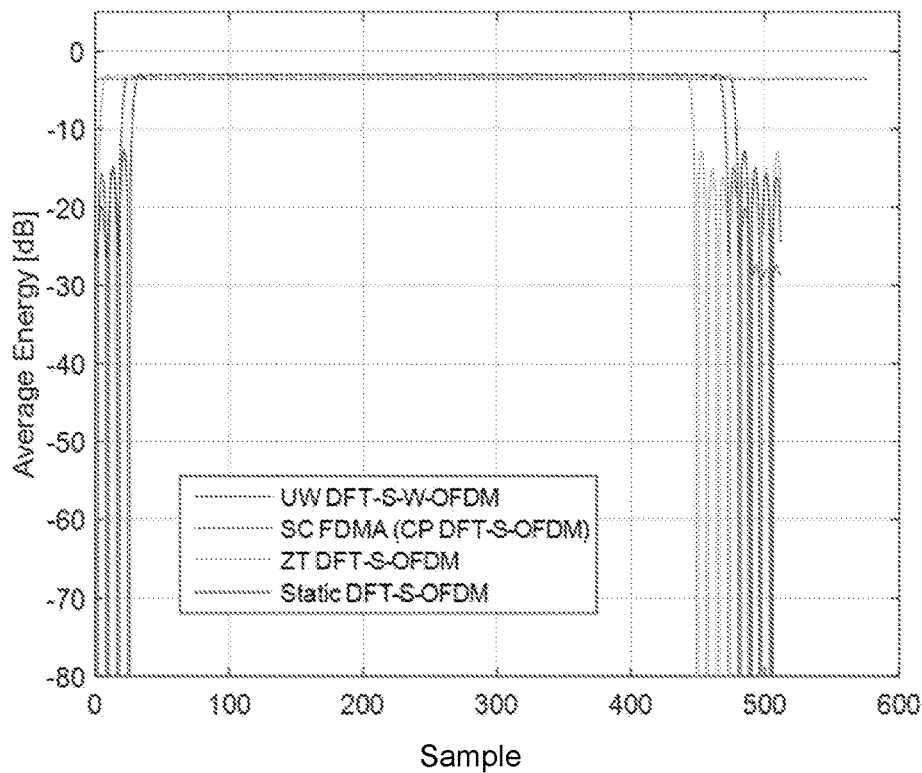
FIG. 13 illustrates average energy of samples of various waveforms, including a representative example of a unique word (UW) discrete Fourier transform (DFT) spread and windowed orthogonal frequency division multiplexing (OFDM) ("UW DFT-S-W-OFDM") waveform.
Figure 13:
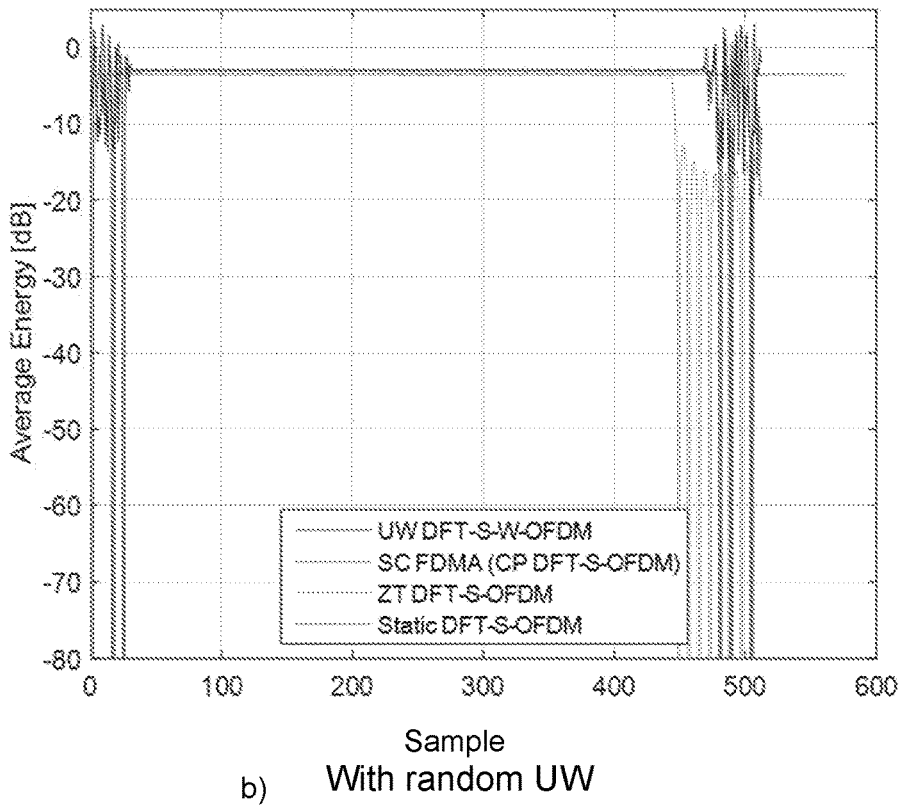

In FIG. 13, the average energy of the samples is provided for CP DFT-s-OFDM, ZT DFT-s-OFDM, UW DFT-S-W-OFDM and static UW DFT-s-OFDM waveforms. To compare the tails of schemes, the UW signal is not included in FIG. 13(a). As shown in FIG. 10, the CP DFT-s-OFDM waveform utilizes 512+64 samples in time, while the ZT DFT-s-OFDM and the UW DFT-S-W-OFDM waveforms both utilize 512 samples. Since the power of the tail part is 15 dB lower than that of the non-tail part for the ZT DFT-s-OFDM waveform and changes depending on the data, ISI can be a limiting factor for the ZT DFT-s-OFDM waveform in a rich scattering environment. In contrast, the tail decays faster in the UW DFT-S-W-OFDM waveform as compared ZT DFT-s-OFDM waveform due to the filter and the position of the main portion of the data part being adjusted in the time domain (e.g., for immunity against inter-symbol interference). In FIG. 13(b), the UW is added to the waveforms. Due to the circular convolution for the UW symbols, UW signal appears at both edges of the symbols.

Example OOB Leakage

Figure 14:
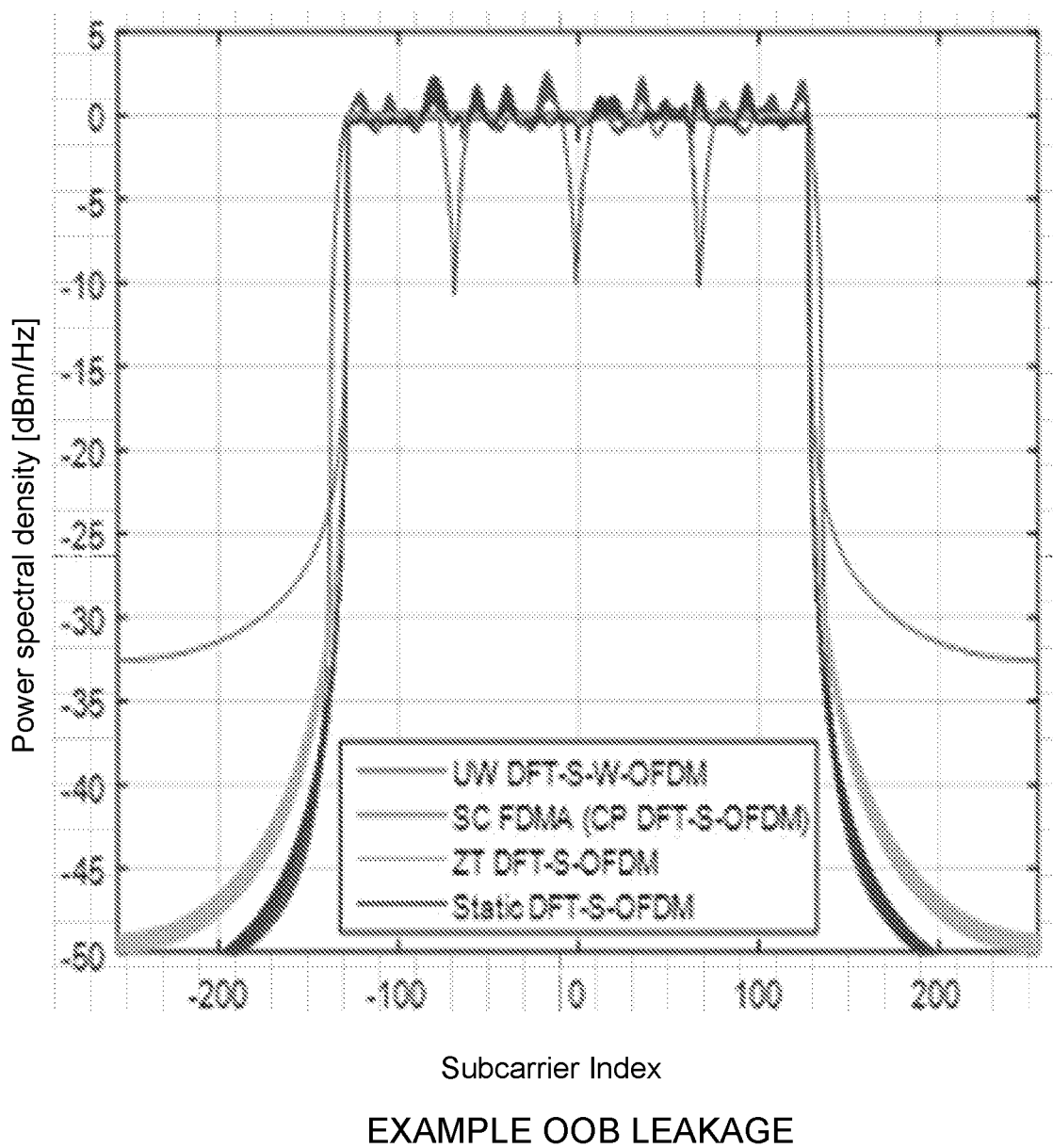
FIG. 14 illustrates out-of-band (OOB) leakage of various waveforms, including a representative example of a UW DFT-S-W-OFDM waveform.

In FIG. 14, the power spectrum for CP DFT-s-OFDM, ZT DFT-s-OFDM, UW DFT-S-W-OFDM and static DFT-s-OFDM waveforms are provided. The Welch's averaged periodogram method is utilized to estimate the power spectrum. Since the upper-end of the DFT units are set to zero for the ZT DFT-s-OFDM and small values generated based on data for the DFT-S-W-OFDM waveform, the symbol transitions are smoothed for all of the waveforms other than the CP DFT-s-OFDM waveform. The ZT DFT-s-OFDM, static DFT-s-OFDM and the DFT-S-W-OFDM waveforms all yield better OOB leakage performance compared to the CP DFT-s-OFDM waveform. The UW DFT-S-W-OFDM waveform exhibits slightly better OOB leakage performance as compared to the ZT DFT-s-OFDM waveform as it achieves a better continuity due to the modification of the filter and concentrating the data symbol in the middle of the symbol in time domain. The introduced guard bands between the subcarrier subsets are also observable in FIG. 14 for the DFT-S-W-OFDM waveform.

Example PAPR Performance

Figure 15:
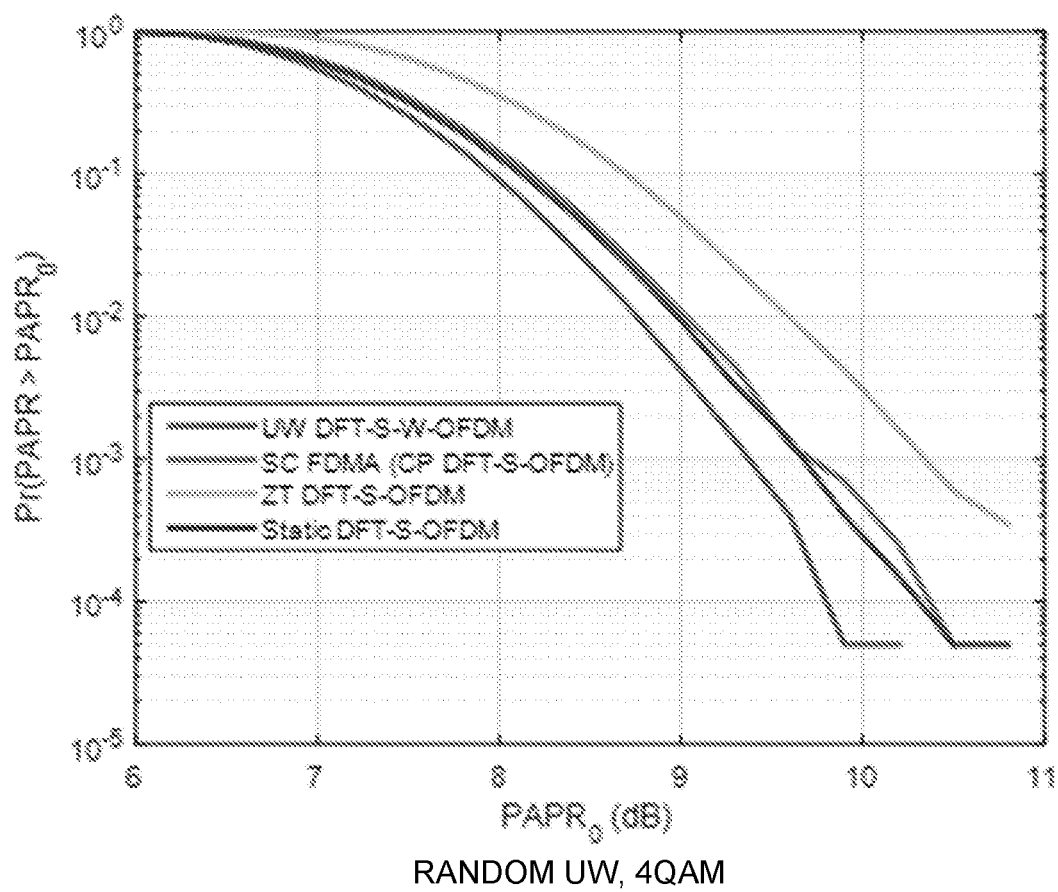
FIG. 15 illustrates an example peak-to-average power ratio (PAPR) performance evaluation of various waveforms, including a representative example of a UW DFT-S-W-OFDM waveform.

In FIG. 15 (Random UW. 4QAM), the PAPR performance is evaluated using the complementary cumulative distribution function (CCDF). Static DFT-s-OFDM and CP DFT-s-OFDM have similar characteristics. The DFT-S-W-OFDM waveform is superior to the other waveforms as it controls the side lobes of pulse shape.

Example BER Performance

To achieve a fair comparison of the BER performance of the different waveforms, identical symbol energy is considered in the simulations, i.e., the energy per symbol is normalized by considering the energy consumed by CP for the CP DFT-s-OFDM waveforms, and the redundant subcarriers for the DFT-S-W-OFDM waveform. For all the waveforms, we consider a maximum mean square error (MMSE) FDE (MMSE-FDE) which allows a receiver to the exploit the path diversity for SC systems. No channel coding is considered in the simulations. For UW-DFT-S-W-OFDM waveform, the receiver applies match filtering based on the structure illustrated in FIG. 10.

Figure 16:
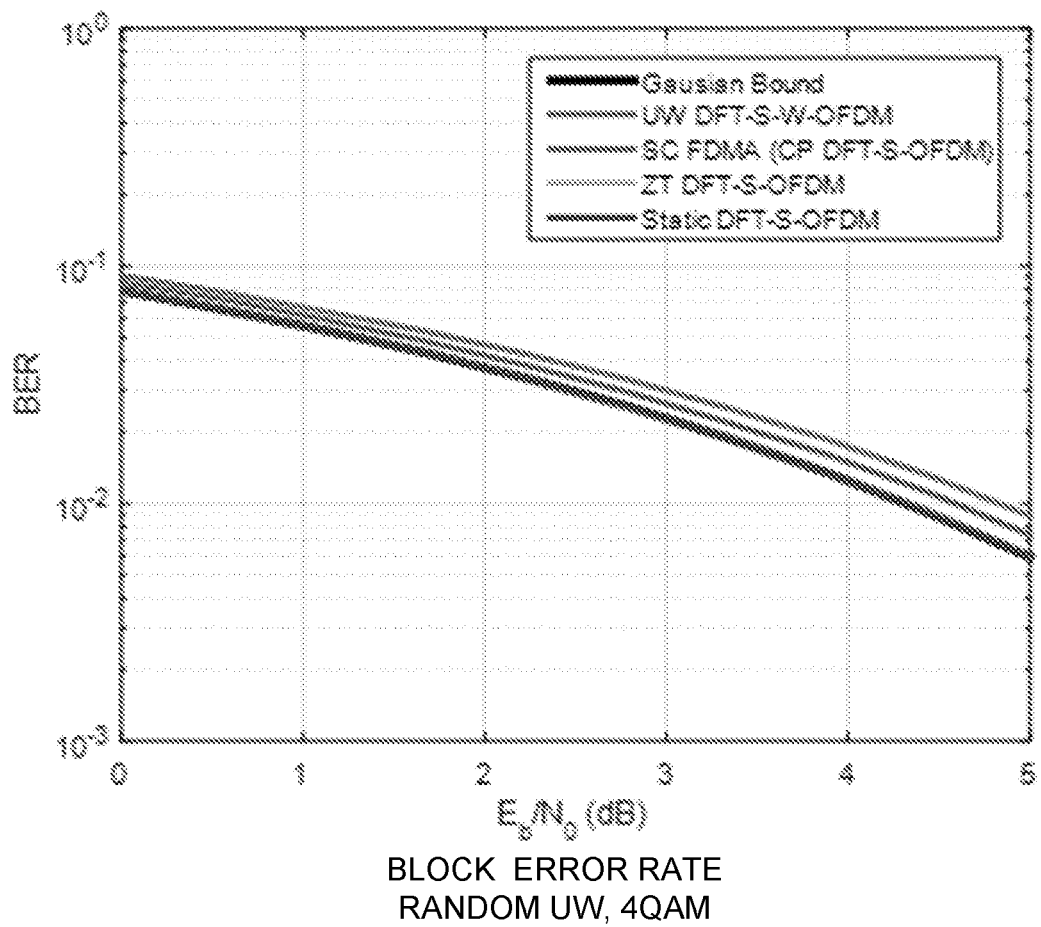
FIG. 16 illustrates an example block error rate (BER) performance evaluation of various waveforms, including a representative example of a UW DFT-S-W-OFDM waveform.

In FIG. 16 (Random UW, 4QAM), the BER performance is evaluated in an additive white Gaussian noise (AWGN) channel. The UW scheme allows the receiver to exploit all the symbol energy; by contrast, some portion of the symbol energy is lost for the CP DFT-s-OFDM scheme as the CP is discarded. The DFT-S-W-OFDM waveform distorts the $f_{DOM}$ signal instances due to use of clipping approach for the filter. Hence, it offers slightly reduced performance as compared to Gaussian bound. The other waveforms attain the Gaussian BER bound.

Figure 17:
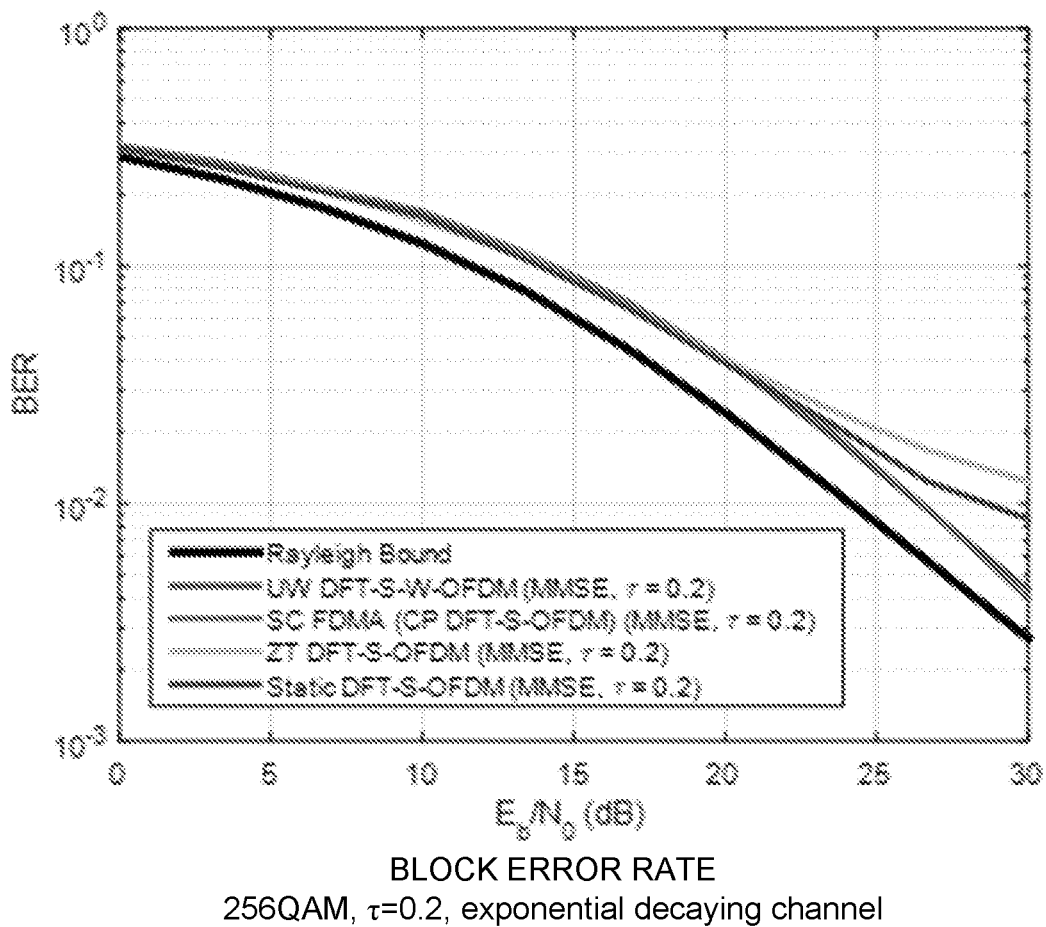
FIG. 17 illustrates an example BER performance evaluation of various waveforms, including a representative example of a UW DFT-S-W-OFDM waveform.

In FIG. 17 (BER-256QAM, τ=0.2, exponential decaying channel), the BER performance is investigated by considering the impact of the multipath channel. When τ=0.2, both of the CP DFT-s-OFDM waveform and the DFT-S-W-OFDM waveform yield a better BER performance, and both of the ZT DFT-s-OFDM waveform and the static DFT-s-OFDM waveform saturate at a high SNR. This may be understood by noting that the ZT DFT-s-OFDM waveform does not exactly maintain a circular convolution of the channel and ISI dominates the noise. The filtering operation in the DFT-S-W-OFDM waveform mitigates the energy at the tail and addresses the limitations of the other schemes.

Appendix A
Proposition 1 (Upsampling):
The DFT of an upsampled sequence in time generates periodic sequence at the output of DFT with period equal to the size of original sequence.

Proof 1:
Let x[n], for n=0, 1, ..., N−1, be a sequence with the length of N and $N_{up}$ be the upsampling factor. Then, the upsampled sequence y[n] can be represented as $$y[n] = \begin{cases} x\left[\dfrac{n}{N_{up}}\right] & \dfrac{n}{N_{up}} \in \mathbb{Z} \\ 0 & \text{otherwise} \end{cases},$$

for n=0, 1, ..., N $N_{up}$−1. The DFT of x[n] can be calculated as $$X[\ell] = \sum_{n=0}^{N-1} x[n] e^{-j2\pi \ell \frac{n}{N}},$$

where l=0, ..., N−1. Therefore, the DFT of y[n] can be expressed as $$Y[k] = \sum_{n=0}^{NN_{up}-1} y[n] e^{-j2\pi k \frac{n}{NN_{up}}} \stackrel{(a)}{=} \sum_{n=0}^{N-1} y[nN_{up}] e^{-j2\pi k \frac{nN_{up}}{NN_{up}}} = \sum_{n=0}^{N-1} x[n] e^{-j2\pi k \frac{n}{N}}$$

for k=0, ..., N $N_{up}$−1, where (a) is true due to the fact that y[n] is zero when $$\frac{n}{N_{up}}$$

is not an integer. Then, Y[k] is a periodic with period of N since $$Y[k + iN] = \sum_{n=0}^{N-1} x[n] e^{-j2\pi(k+iN)\frac{n}{N}} = \underbrace{\sum_{n=0}^{N-1} x[n] e^{-j2\pi k \frac{n}{N}} e^{-2\pi j i n}}_{=1} = \sum_{n=0}^{N-1} x[n] e^{-j2\pi k \frac{n}{N}} = Y[k],$$

for any integers k and i that satisfy 0≤k+iN≤N $N_{up}$−1.
Note that Proposition 1 is also true for IDFT.

Appendix B
Proposition 2 (Relation Between Linear Convolution and Circular Convolution):
Let h[n] and x[n] be the sequences of lengths of L and N, respectively. Then, $$h_p[n] \circledast x_p[n] = h[n] * x[n] = \sum_{m=0}^{S} H_p[m] X_p[m] e^{j2\pi m \frac{n}{S}},$$

where $H_p[l]$ and $X_p[l]$ are the DFTs of the zero padded sequences of $h_p[n]$ and $x_p[n]$ of lengths of S≥N+L−1 given by $$h_p[n] \triangleq \begin{cases} h[n] & 0 \le n < L-1 \\ 0 & \text{otherwise} \end{cases}$$

and $$x_p[n] \triangleq \begin{cases} x[n] & 0 \le n < N-1 \\ 0 & \text{otherwise} \end{cases}.$$

Proof 2:
The definition of circular convolution is given by $$h_p[n] \circledast x_p[n] \triangleq \sum_{k=0}^{S-1} x_p[k] h_p[(n-k) \bmod S] \stackrel{(a)}{=}$$

$$\sum_{k=0}^{N-1} x[k] h_p[(n-k) \bmod S] \stackrel{(b)}{=} \sum_{k=0}^{N-1} x[k] h[(n-k)] = h[n] * x[n]$$

where (a) is true by the definition of $x_p[n]$. If −N≤(n−k)<N+L−1, $h_p[(n-k) \bmod S] = h[(n-k)]$ which hold true when S≥N+L−1.

For the second part of the proposition, the definition of the circular convolution may be as follows:

$$h_p[n] \circledast x_p[n] \triangleq \sum_{k=0}^{S-1} x_p[k] h_p[(n-k) \bmod S]$$

$$= \sum_{k=0}^{S-1} \sum_{m=0}^{S-1} X_p[m] e^{j2\pi m \frac{k}{S}} \sum_{\ell=0}^{S-1} H_p[\ell] e^{j2\pi \ell \frac{n-k}{S}}$$

$$= \sum_{m=0}^{S-1} X_p[m] \sum_{k=0}^{S-1} \sum_{l=0}^{S-1} H_p[\ell] e^{j2\pi \frac{-\ell k + mk + \ell n}{S}}$$

$$= \sum_{m=0}^{S-1} X_p[m] \sum_{\ell=0}^{S-1} H_p[\ell] e^{j2\pi \frac{\ell n}{S}} \sum_{k=0}^{S-1} e^{j2\pi k \frac{m-\ell}{S}}$$

$$= \sum_{m=0}^{S-1} X_p[m] \sum_{\ell=0}^{S-1} H_p[\ell] e^{j2\pi \frac{\ell n}{S}} \delta(m-\ell)$$

-continued $$= \sum_{m=0}^{S-1} X_p[m]H_p[m]e^{j2\pi\frac{mn}{S}}.$$

Conclusion

Incorporated herein by reference are: International Patent Application No. PCT/US16/64196, filed 30 Nov. 2016; U.S. Provisional Patent Application No. 62/262,649, filed 3 Dec. 2015; International Patent Application No. PCT/US16/41284, filed 7 Jul. 2016; and U.S. Provisional Patent Application No. 62/19,512, filed 9 Jul. 2014.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. For example, although various waveform generators are shown in the figures and described herein as including UW generators, the various waveform generators might not include the UW generators. The UW generators may be included in the various transmitters as separate entities from the waveform generators. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the term "video" may mean any of a snapshot, single image and/or multiple images displayed over a time basis. As another example, when referred to herein, the terms "user equipment" and its abbreviation "UE" may mean (i) a wireless transmit and/or receive unit (WTRU), such as described supra; (ii) any of a number of embodiments of a WTRU, such as described supra; (iii) a wireless-capable and/or wired-capable (e.g., tetherable) device configured with, inter alia, some or all structures and functionality of a WTRU, such as described supra; (iii) a wireless-capable and/or wired-capable device configured with less than all structures and functionality of a WTRU, such as described supra; or (iv) the like. Details of an example WTRU, which may be representative of any WTRU recited herein, are provided herein with respect to FIGS. 1A-1E and 2.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 6 or means-plus-function claim format, and any claim without the terms "means for" is not so intended.

What is claimed is:

1. A method implemented in a transmitter comprising:
    transforming a set of data symbols and a unique word (UW) sequence into a frequency domain ("$f_{DOM}$") signal using a discrete Fourier transform (DFT);
    replicating the $f_{DOM}$ signal so as to form a plurality of $f_{DOM}$ signal instances, wherein the plurality of $f_{DOM}$ signal instances is inclusive of the $f_{DOM}$ signal;
    shaping each of the plurality of $f_{DOM}$ signal instances using one or more of a plurality of coefficients at least in part to suppress time domain samples that contribute to inter-symbol interference, wherein the plurality of coefficients are determined based on a time domain filter and correspond to a frequency response of the time domain filter, and wherein the time domain filter has a length that is less than or equal to a number of time domain samples that corresponds to an internal guard interval including the UW sequence;
    combining the plurality of shaped $f_{DOM}$ signal instances to form a combined $f_{DOM}$ signal;
    transforming the combined $f_{DOM}$ signal into a block-based signal using an inverse DFT (IDFT); and
    transmitting the block-based signal.

2. The method of claim 1, wherein the combined $f_{DOM}$ signal is mapped to a set of subcarriers.

3. The method of claim 1, wherein the combined $f_{DOM}$ signal is mapped to a set of subcarriers, and wherein combining the plurality of shaped $f_{DOM}$ signal instances to form a combined $f_{DOM}$ signal comprises mapping the plurality of shaped $f_{DOM}$ signal instances to a respective plurality of subsets of the set of subcarriers.

4. The method of claim 3, wherein at least one of the subsets of the plurality of subsets is not mutually exclusive from at least one other subset of the plurality of subsets.

5. The method of claim 2, wherein combining the plurality of shaped $f_{DOM}$ signal instances to form a combined $f_{DOM}$ signal comprises mapping the plurality of shaped $f_{DOM}$ signal instances to a respective plurality of adjacent, non-overlapping subsets.

6. The method of claim 1, wherein the DFT and the IDFT have respective sizes, wherein the size of the IDFT (IDFT size) is larger than the size of the DFT (DFT size), wherein the plurality of $f_{DOM}$ signal instances comprises a number, k, of $f_{DOM}$ signal instances, and wherein the number, k, corresponds to a ratio of the IDFT size to the DFT size.

7. The method of claim 1, wherein shaping each of the plurality of $f_{DOM}$ signal instances using one or more of a plurality of coefficients comprises:
    performing frequency-domain windowing on the plurality of $f_{DOM}$ signal instances.

8. The method of claim 1, wherein the plurality of coefficients comprises a plurality of sets of coefficients, wherein the plurality of sets of coefficients corresponds to the plurality of $f_{DOM}$ signal instances, respectively, wherein the plurality of $f_{DOM}$ signal instances corresponds to a respective plurality of sets of subcarriers, and wherein shaping each of the plurality of $f_{DOM}$ signal instances comprises applying the plurality of sets of coefficients to the plurality of $f_{DOM}$ signal instances, respectively.

9. The method of claim 8, wherein the plurality of sets of coefficients are rotated with a respective plurality of complex coefficients.

10. The method of claim 7, wherein the performing frequency domain windowing comprises:
    multiplying the plurality of $f_{DOM}$ signal instances with the plurality of coefficients, wherein the frequency response of the time domain filter suppresses one or more samples of one or more of the plurality of $f_{DOM}$ signal instances.

11. The method of claim 1, wherein the internal guard interval is based on an up-sampling factor, and wherein the up-sampling factor corresponds to a ratio of the IDFT size to the DFT size.

12. The method of claim 7, wherein the performing frequency domain windowing comprises:
multiplying the plurality of $f_{DOM}$ signal instances with the plurality of coefficients, wherein the time domain filter has sidelobes smaller than a Dirichlet sinc function.

13. A transmitter comprising: a discrete Fourier transform (DFT) unit; a processing unit; and an inverse DFT (IDFT) unit, wherein:
the DFT unit is configured to transform a set of data symbols and a unique word (UW) sequence into a frequency domain ("$f_{DOM}$") signal using a DFT;
the processing unit is configured to:
replicate the $f_{DOM}$ signal so as to form a plurality of $f_{DOM}$ signal instances, wherein the plurality of $f_{DOM}$ signal instances is inclusive of the $f_{DOM}$ signal;
shape each of the plurality of $f_{DOM}$ signal instances using one or more of a plurality of coefficients at least in part to suppress time domain samples that contribute to inter-symbol interference, wherein the plurality of coefficients are determined based on a time domain filter and correspond to a frequency response of the time domain filter, and wherein the time domain filter has a length that is less than or equal to a number of time domain samples that corresponds to an internal guard interval including the UW sequence;
combine the plurality of shaped $f_{DOM}$ signal instances to form a combined $f_{DOM}$ signal; and
the IDFT unit is configured to:
transform the combined $f_{DOM}$ signal into a block-based signal using an IDFT; and
the transmitter is further configured to:
transmit the block-based signal.

14. The transmitter of claim 13, wherein the processing unit is configured to shape each of the plurality of $f_{DOM}$ signal instances using one or more of a plurality of coefficients, at least in part, by:
performing frequency-domain windowing on the plurality of $f_{DOM}$ signal instances.

15. The transmitter of claim 14, wherein the processing unit is configured to perform the frequency domain windowing, at least in part, by:
multiplying the plurality of $f_{DOM}$ signal instances with the plurality of coefficients, wherein the frequency response of the time domain filter suppresses one or more samples of one or more of the plurality of $f_{DOM}$ signal instances.

16. A method implemented in a transmitter comprising:
transforming a first set of data symbols and a first unique word (UW) sequence into a first frequency domain ("$f_{DOM}$") signal using a first discrete Fourier transform (DFT);
replicating the first $f_{DOM}$ signal so as to form a plurality of first $f_{DOM}$ signal instances, wherein the plurality of first $f_{DOM}$ signal instances is inclusive of the first $f_{DOM}$ signal;
shaping each of the plurality of first $f_{DOM}$ signal instances using one or more of a first plurality of coefficients at least in part to suppress first time domain samples that contribute to a first inter-symbol interference, wherein the first plurality of coefficients are determined based on a first time domain filter and correspond to a first frequency response of the first time domain filter, and wherein the first time domain filter has a length that is less than or equal to a first number of time domain samples that corresponds to a first internal guard interval including the first UW sequence;
combining the plurality of shaped first $f_{DOM}$ signal instances to form a first combined $f_{DOM}$ signal;
transforming a second set of data symbols and a second UW sequence into a second $f_{DOM}$ signal using a second DFT;
replicating the second $f_{DOM}$ signal so as to form a plurality of second $f_{DOM}$ signal instances, wherein the plurality of second $f_{DOM}$ signal instances is inclusive of the second $f_{DOM}$ signal;
shaping each of the plurality of second $f_{DOM}$ signal instances using one or more of a second plurality of coefficients at least in part to suppress second time domain samples that contribute to a second inter-symbol interference, wherein the second plurality of coefficients are determined based on a second time domain filter and correspond to a second frequency response of the second time domain filter, and wherein the second time domain filter has a length that is less than or equal to a second number of time domain samples that corresponds to a second internal guard interval including the second UW sequence;
combining the plurality of shaped second $f_{DOM}$ signal instances to form a second combined $f_{DOM}$ signal;
adding the first combined $f_{DOM}$ signal and the second combined $f_{DOM}$ signal to form a third $f_{DOM}$ signal;
transforming the third $f_{DOM}$ signal into a block-based signal using an inverse DFT (IDFT); and
transmitting the block-based signal.

17. The method of claim 16, wherein the third $f_{DOM}$ signal is mapped to a set of subcarriers, and wherein at least one of:
(a) combining the plurality of shaped first $f_{DOM}$ signal instances to form a first combined $f_{DOM}$ signal comprises mapping the plurality of shaped first $f_{DOM}$ signal instances to the set of subcarriers; and
combining the plurality of shaped second $f_{DOM}$ signal instances to form a second combined $f_{DOM}$ signal comprises mapping the plurality of shaped second $f_{DOM}$ signal instances to the set of subcarriers;
(b) a sample of the first combined $f_{DOM}$ signal is mapped to a subcarrier of the set of subcarriers;
a sample of the second combined $f_{DOM}$ signal is mapped the same subcarrier of the set of subcarriers; and
adding the first combined $f_{DOM}$ signal and the second combined $f_{DOM}$ signal to form a third $f_{DOM}$ signal comprises adding the sample of the first combined $f_{DOM}$ signal and the sample of the second combined $f_{DOM}$ signal;
(c) combining the plurality of shaped first $f_{DOM}$ signal instances to form a first combined $f_{DOM}$ signal comprises mapping the plurality of shaped first $f_{DOM}$ signal instances to a first partition of the set of subcarriers; and
combining the plurality of shaped second $f_{DOM}$ signal instances to form a second combined $f_{DOM}$ signal comprises mapping the plurality of shaped second $f_{DOM}$ signal instances to a second partition of the set of subcarriers;
(d) combining the plurality of shaped first $f_{DOM}$ signal instances to form a first combined $f_{DOM}$ signal comprises mapping the plurality of shaped first $f_{DOM}$ signal instances to a first subset of the set of subcarriers; and
combining the plurality of shaped second $f_{DOM}$ signal instances to form a second combined $f_{DOM}$ signal comprises mapping the plurality of shaped second $f_{DOM}$ signal instances to a second subset of the set of subcarriers, wherein the first and second subsets have one or more subcarriers in common; or (e) the plurality of first $f_{DOM}$ signal instances are mapped to a first subset of the set of subcarriers;

the plurality of second $f_{DOM}$ signal instances are mapped to a second subset of the set of subcarriers;

the first and second subsets have one or more subcarriers in common; and adding the first combined $f_{DOM}$ signal and the second combined $f_{DOM}$ signal to form a third $f_{DOM}$ signal comprises:

adding one or more samples of the first combined $f_{DOM}$ signal and the second combined $f_{DOM}$ signal mapped to the one or more subcarriers in common; and appending to the added samples: (i) one or more samples of the first combined $f_{DOM}$ signal mapped to subcarriers of the first subset other than the one or more subcarriers in common; and (ii) one or more samples of the second combined $f_{DOM}$ signal mapped to subcarriers of the second subset other than the one or more subcarriers in common.

18. The method of claim 16, wherein:

adding the first combined $f_{DOM}$ signal and the second combined $f_{DOM}$ signal to form a third $f_{DOM}$ signal comprises concatenating the first combined $f_{DOM}$ signal and the second combined $f_{DOM}$ signal.

19. The method of claim 16, wherein the first time domain filter is the same as the second time domain filter.

20. The transmitter of claim 13, wherein the plurality of coefficients comprises a plurality of sets of coefficients, wherein the plurality of sets of coefficients corresponds to the plurality of $f_{DOM}$ signal instances, respectively, wherein the plurality of $f_{DOM}$ signal instances corresponds to a respective plurality of sets of subcarriers, and wherein the processing unit is configured to shape the plurality of $f_{DOM}$ signal instances, at least in part, by applying the plurality of sets of coefficients to the plurality of $f_{DOM}$ signal instances, respectively.

21. The transmitter of claim 20, wherein the plurality of sets of coefficients are rotated with a respective plurality of complex coefficients.

22. The transmitter of claim 13, wherein the internal guard interval is based on an up-sampling factor, and wherein the up-sampling factor corresponds to a ratio of the IDFT size to the DFT size.

23. The transmitter of claim 14, wherein the processing unit is configured to perform the frequency domain windowing, at least in part, by:

multiplying the plurality of $f_{DOM}$ signal instances with the plurality of coefficients, wherein the time domain filter has sidelobes smaller than a Dirichlet sinc function.

24. The transmitter of claim 13, wherein the combined $f_{DOM}$ signal is mapped to a set of subcarriers, and wherein combining the plurality of shaped $f_{DOM}$ signal instances to form a combined $f_{DOM}$ signal comprises mapping the plurality of shaped $f_{DOM}$ signal instances to a respective plurality of subsets of the set of subcarriers.

25. The transmitter of claim 13, wherein the DFT and the IDFT have respective sizes, wherein the size of the IDFT (IDFT size) is larger than the size of the DFT (DFT size), wherein the plurality of $f_{DOM}$ signal instances comprises a number, k, of $f_{DOM}$ signal instances, and wherein the number, k, corresponds to a ratio of the IDFT size to the DFT size.

\* \* \* \* \*